(12) United States Patent
Yun et al.

(10) Patent No.: US 11,281,026 B2
(45) Date of Patent: Mar. 22, 2022

(54) OPTICAL LENS AND EYEWEAR INCLUDING SAME

(71) Applicant: 3M INNOVATIVE PROPERTIES COMPANY, St. Paul, MN (US)

(72) Inventors: Zhisheng Yun, Woodbury, MN (US); Andrew J. Ouderkirk, Kirkland, WA (US); Susan L. Kent, Shorewood, MN (US); Erin A. McDowell, Afton, MN (US); Timothy L. Wong, St. Paul, MN (US); John D. Le, Woodbury, MN (US); Michael L. Steiner, New Richmond, WI (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 190 days.

(21) Appl. No.: 16/341,143

(22) PCT Filed: Nov. 8, 2017

(86) PCT No.: PCT/US2017/060603
§ 371 (c)(1),
(2) Date: Apr. 11, 2019

(87) PCT Pub. No.: WO2018/093633
PCT Pub. Date: May 24, 2018

(65) Prior Publication Data
US 2020/0192126 A1    Jun. 18, 2020

Related U.S. Application Data

(60) Provisional application No. 62/422,363, filed on Nov. 15, 2016.

(51) Int. Cl.
G02C 7/12 (2006.01)
G02C 7/06 (2006.01)
G02C 7/02 (2006.01)

(52) U.S. Cl.
CPC .............. G02C 7/12 (2013.01); G02C 7/022 (2013.01); G02C 7/06 (2013.01)

(58) Field of Classification Search
CPC . G02C 7/022; G02C 7/12; G02C 7/02; G02C 7/06; G02C 7/061; G02C 7/041;
(Continued)

(56) References Cited

U.S. PATENT DOCUMENTS

RE27,356 E    5/1972  Russa
5,007,727 A   4/1991  Kahaney
(Continued)

FOREIGN PATENT DOCUMENTS

EP    0718645       6/1996
WO    WO 2017-039714  3/2017

OTHER PUBLICATIONS

International Search report for PCT International Application No. PCT/US2017/060603 dated Apr. 19, 2018, 7 pages.

*Primary Examiner* — Jordan M Schwartz
(74) *Attorney, Agent, or Firm* — Clifton F. Richardson

(57) ABSTRACT

An optical lens including first and second polarizers, a partial reflector disposed between the first and second polarizers, a first phase retarder disposed between the first polarizer and the partial reflector, and a second phase retarder disposed between the partial reflector and the second polarizer is described. The optical lens is a single piece configured for use in an eyewear. Eyewear including at least one of the optical lenses is also described.

10 Claims, 16 Drawing Sheets

(58) Field of Classification Search
CPC ...... G02C 7/14; G02B 3/0056; G02B 3/0062; G02B 3/0068; G02B 3/10
See application file for complete search history.

(56) References Cited

U.S. PATENT DOCUMENTS

| | | | |
|---|---|---|---|
| 6,075,651 A | 6/2000 | Hoppe | |
| 6,135,595 A * | 10/2000 | Takeshita | G02C 7/104 351/159.66 |
| 6,400,493 B1 | 6/2002 | Mertz | |
| 6,502,937 B2 | 1/2003 | Yang | |
| 7,106,509 B2 * | 9/2006 | Sharp | G02B 5/3041 351/159.6 |
| 7,583,812 B2 | 9/2009 | Honda | |
| 7,727,352 B2 | 6/2010 | Lesartre | |
| 7,771,045 B2 | 8/2010 | Matera | |
| 8,177,358 B2 | 5/2012 | Matera | |
| 8,649,098 B2 | 2/2014 | Ruhle | |
| 9,001,282 B2 | 4/2015 | Archambeau | |
| 10,338,410 B1 * | 7/2019 | Richards | G02B 3/14 |
| 10,451,947 B1 * | 10/2019 | Lu | G06F 1/1694 |
| 2002/0159150 A1 | 10/2002 | King | |
| 2002/0180916 A1 | 12/2002 | Schadt | |
| 2003/0028048 A1 | 2/2003 | Cherkaoui | |
| 2004/0145701 A1 * | 7/2004 | Miniutti | B29D 11/00884 351/159.24 |
| 2005/0072959 A1 | 4/2005 | Moia | |
| 2006/0146275 A1 * | 7/2006 | Mertz | G02C 7/107 351/44 |
| 2008/0252846 A1 | 10/2008 | Ver | |
| 2009/0052838 A1 | 2/2009 | McDowall et al. | |
| 2010/0053121 A1 * | 3/2010 | Sprague | G02C 7/101 345/204 |
| 2010/0254002 A1 | 10/2010 | Merrill | |
| 2014/0139802 A1 | 5/2014 | Jallouli | |
| 2015/0116658 A1 | 4/2015 | Trapani | |
| 2016/0097930 A1 * | 4/2016 | Robbins | G02B 5/3083 345/8 |
| 2017/0139234 A1 * | 5/2017 | Sharp | G02B 5/3083 |

* cited by examiner

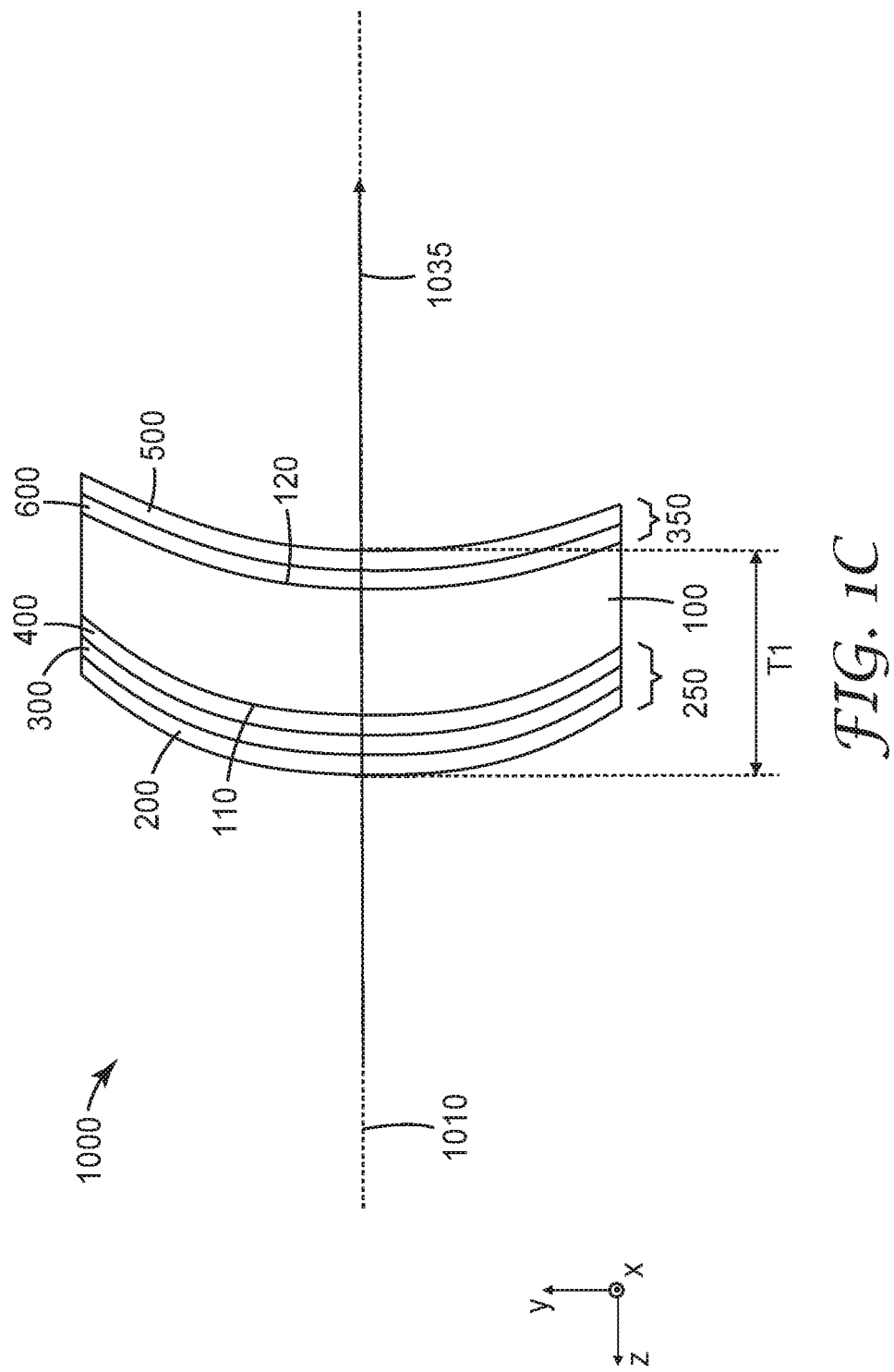

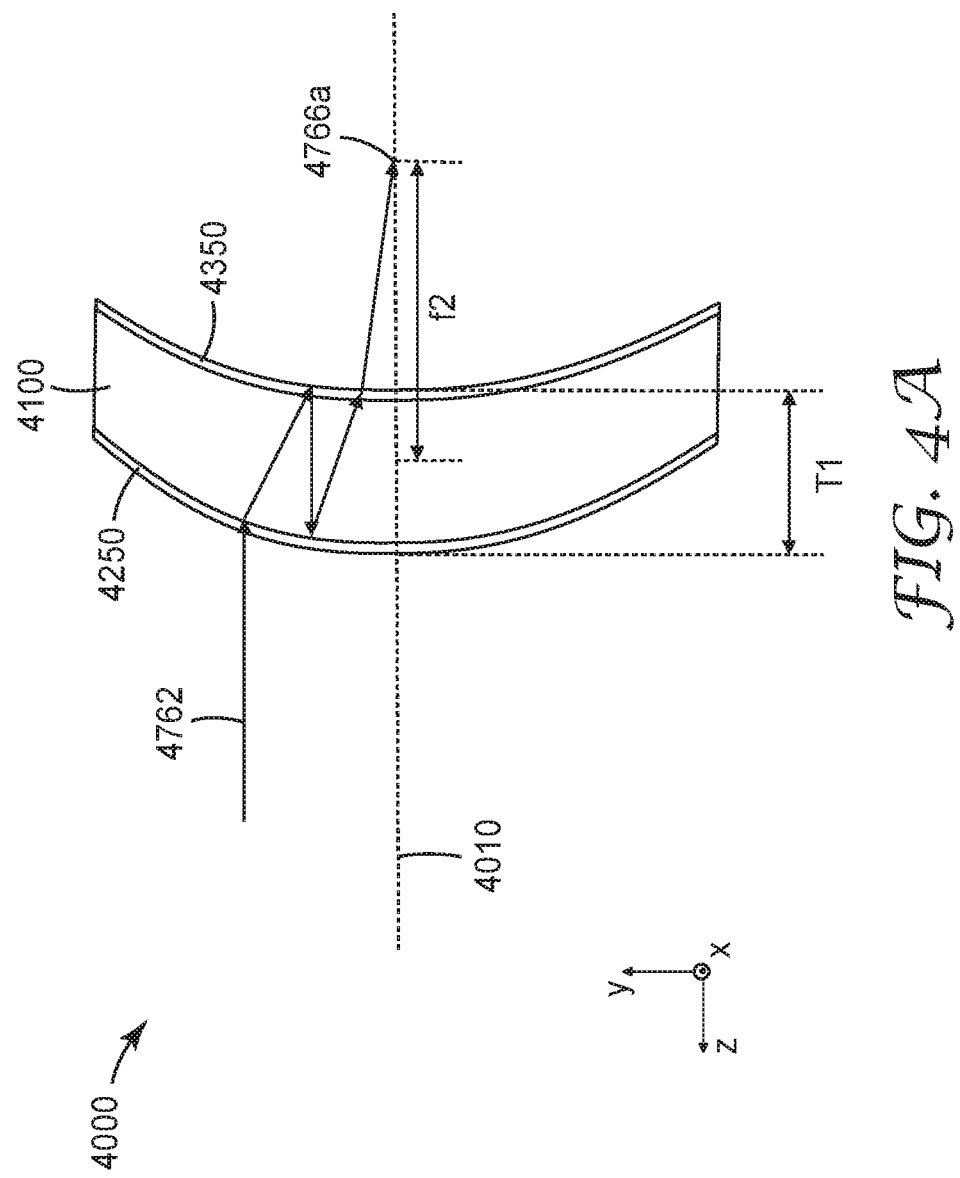

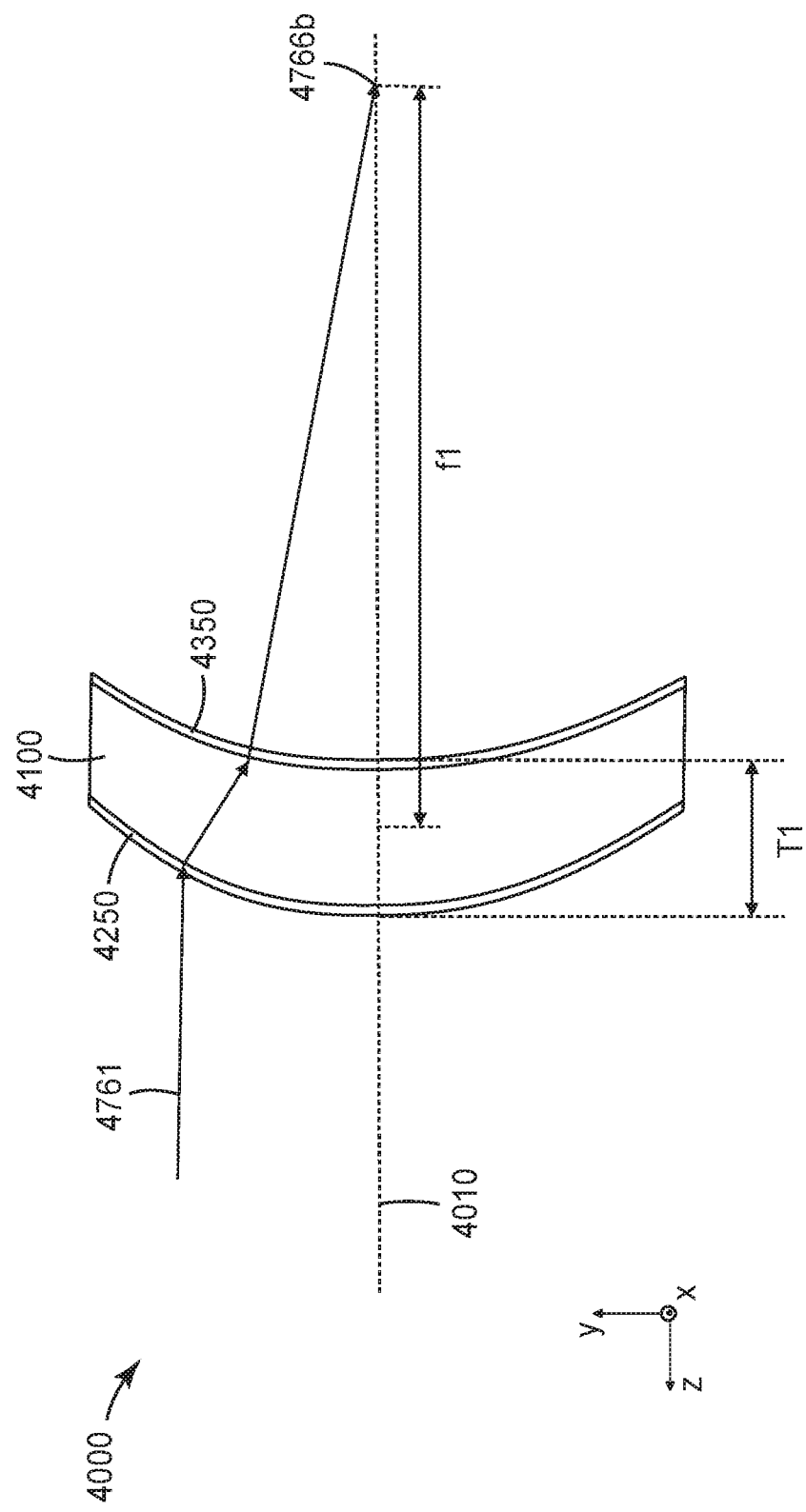

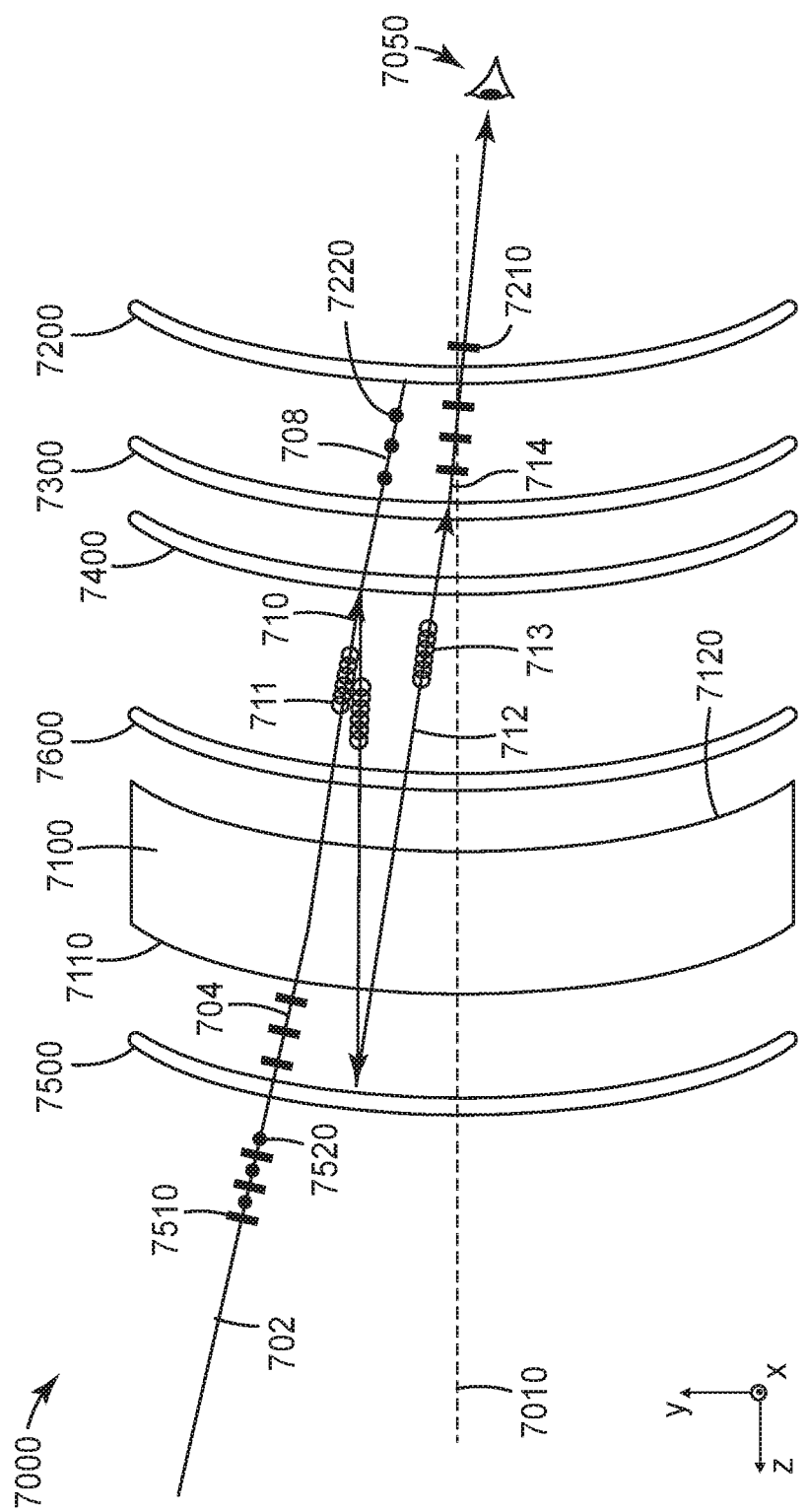

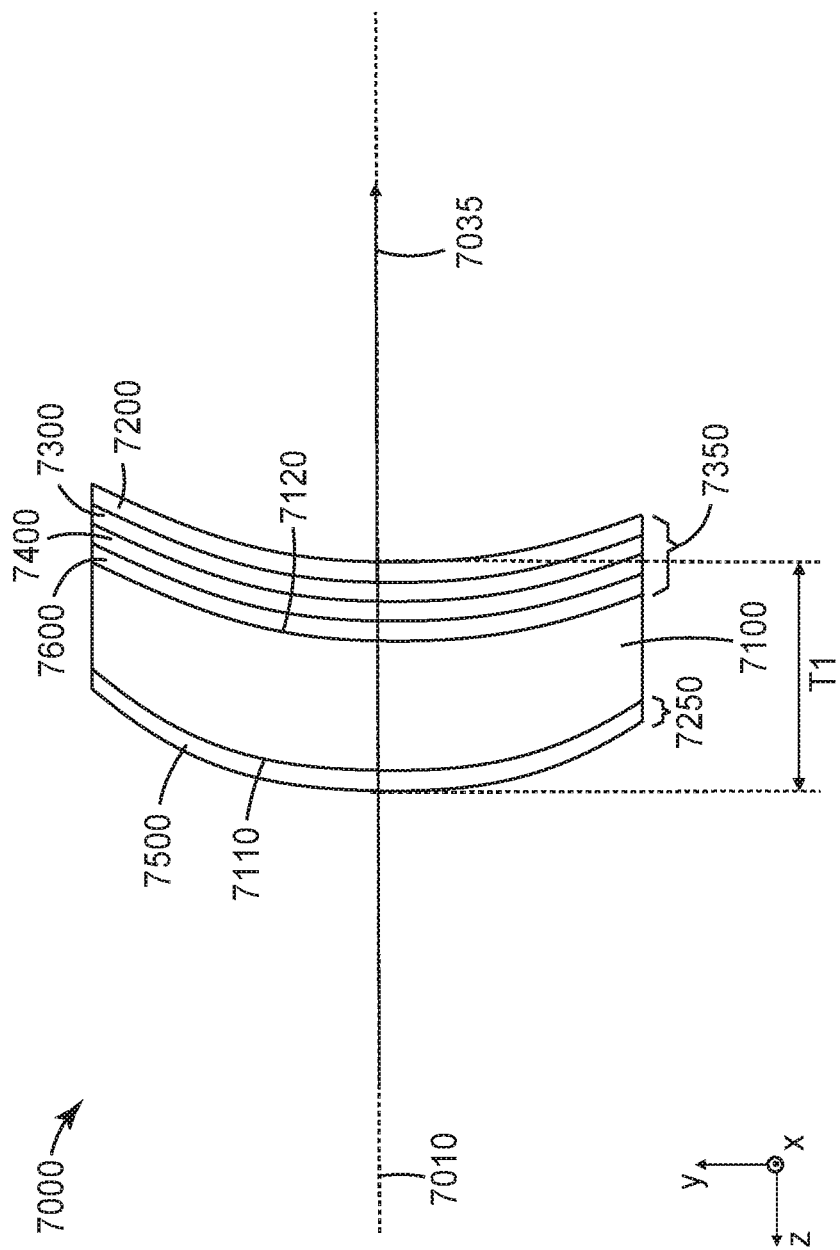

US 11,281,026 B2

OPTICAL LENS AND EYEWEAR INCLUDING SAME

BACKGROUND

Optical lenses used in eyewear utilize refraction at the major surfaces of the lens to provide a desired optical power.

SUMMARY

In some aspects of the present description, an optical lens including first and second polarizers and a partial reflector disposed between the first and second polarizers is provided. The first polarizer substantially transmits light having a first polarization state and substantially blocks light having an orthogonal second polarization state. The second polarizer substantially transmits light having a third polarization state and substantially reflects light having an orthogonal fourth polarization state. The partial reflector has an average optical reflectance of at least 30% for a desired plurality of wavelengths. The optical lens further includes a first phase retarder disposed between the first polarizer and the partial reflector for changing a polarization state of light passing therethrough, and a second phase retarder disposed between the partial reflector and the second polarizer for changing a polarization state of light passing therethrough. The optical lens is a single piece configured for use in an eyewear.

In some aspects of the present description, a bi-focal optical lens for use in an eyewear is provided. The bi-focal optical lens includes a substrate, and a reflective polarizer bonded to the substrate. The reflective polarizer substantially transmits light having a first polarization state and substantially reflects light having an orthogonal second polarization state. The bi-focal optical lens having a longer first focal length for light having the first polarization state and a shorter second focal length for light having the second polarization state, such that without the reflective polarizer, the bi-focal optical lens would have a single focal length.

In some aspects of the present description, a bi-focal optical lens for use in an eyewear is provided. The bi-focal optical lens includes a substrate, and a partial reflector bonded to the substrate. The partial reflector has an average optical reflectance of at least 30% for a desired plurality of wavelengths. The bi-focal optical lens has a longer first focal length for light having a first polarization state and a shorter second focal length for light having an orthogonal second polarization state, such that without the partial reflector, the bi-focal optical lens would have a single focal length.

In some aspects of the present description, an optical lens including a first polarizer, a second polarizer and a partial reflector disposed between the first and second polarizers is provided. The first polarizer substantially transmits light having a first polarization state and substantially blocks light having an orthogonal second polarization state. The second polarizer substantially transmits light having a third polarization state and substantially reflects light having an orthogonal fourth polarization state. The partial reflector has an average optical reflectance of at least 30% for a desired plurality of wavelengths. The optical lens is a single piece configured for use in an eyewear.

In some aspects of the present description, eyewear including the optical lens or the bi-focal optical lens is provided.

BRIEF DESCRIPTION OF THE DRAWINGS

FIG. 1C is a schematic cross-sectional view of the optical lens of FIG. 1A;

FIGS. 4A-4B are schematic cross-sectional views of a bi-focal optical lens;

FIG. 14A is a schematic cross-sectional exploded view of an optical lens; and FIG. 14B is a schematic cross-sectional view of the optical lens of FIG. 14A.

DETAILED DESCRIPTION

In the following description, reference is made to the accompanying drawings that forms a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

In some aspects of the present description, optical lenses are provided which provide a desired optical power and have a thickness smaller than that of a refractive lens having the same optical power. The optical lenses may be used in any application where it is desired to have a thin lens provide a given optical power. The optical lenses are well suited for use in eyewear (e.g., a pair of glasses), for example. The optical lenses used in the eyewear can be monofocal, bi-focal, or progressive prescription lenses. In some embodiments, the eyewear is prescription eyeglasses or prescription sunglasses. In some embodiments, the optical lens provides a desired optical power for light of one polarization and provides a different optical power for light of a different polarization so that the viewer can focus on both near objects and distant objects with little eye strain.

The optical lenses of the present description may include first and second polarizers with a partial reflector disposed therebetween. In some embodiments, the optical lens includes, in sequence from a side configured to face away from a viewer to an opposite side configured to face the viewer, a first polarizer, a first phase retarder, a partial reflector, a second phase retarder, and a second polarizer. In some embodiments, the optical lens includes, in sequence from a side configured to face a viewer to an opposite side configured to face away from the viewer, a first polarizer, a first phase retarder, a partial reflector, a second phase retarder, and a second polarizer.

Figure 1A:
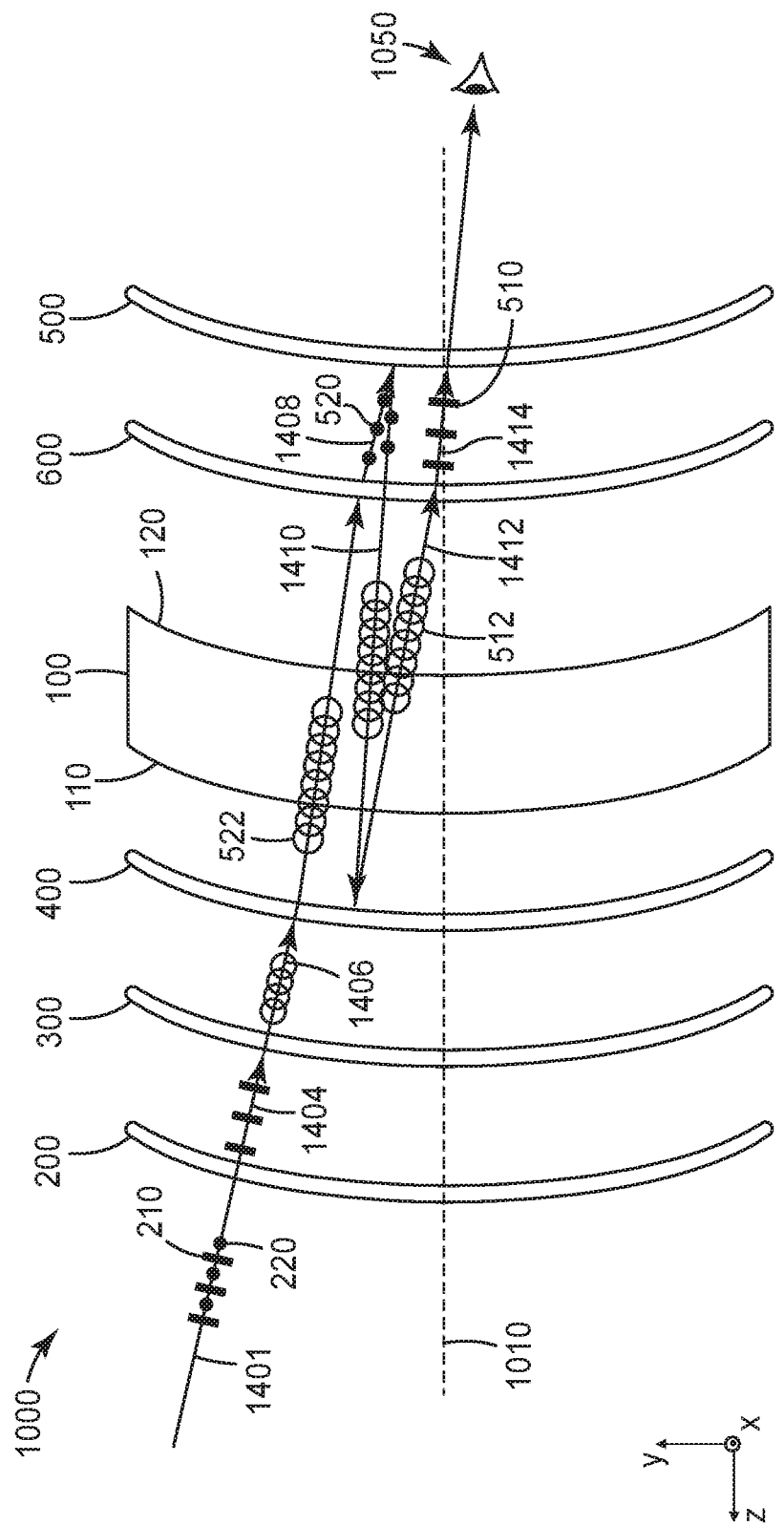
FIGS. 1A-1B are schematic cross-sectional exploded views of optical lenses.
Figure 1B:
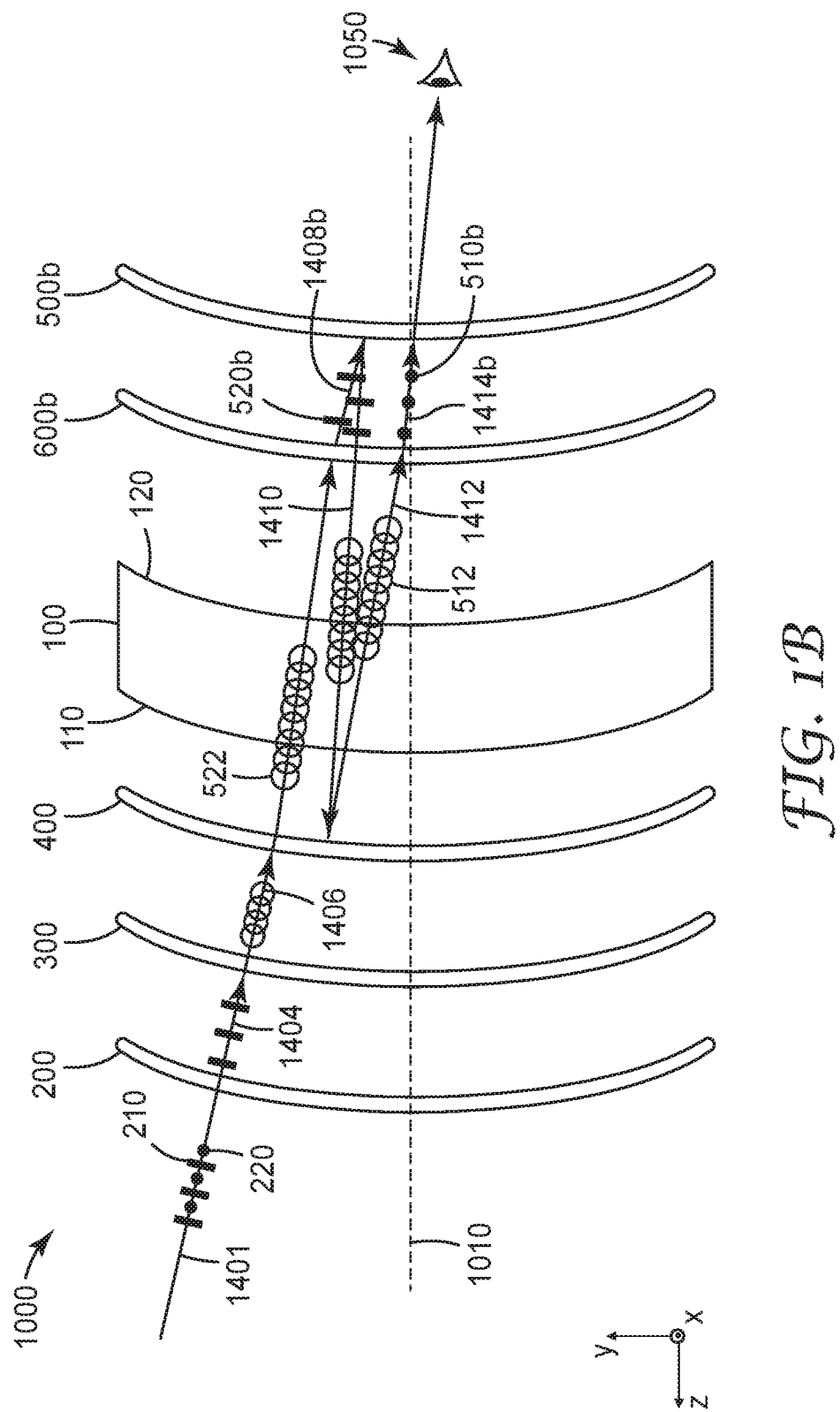
Figure 6:
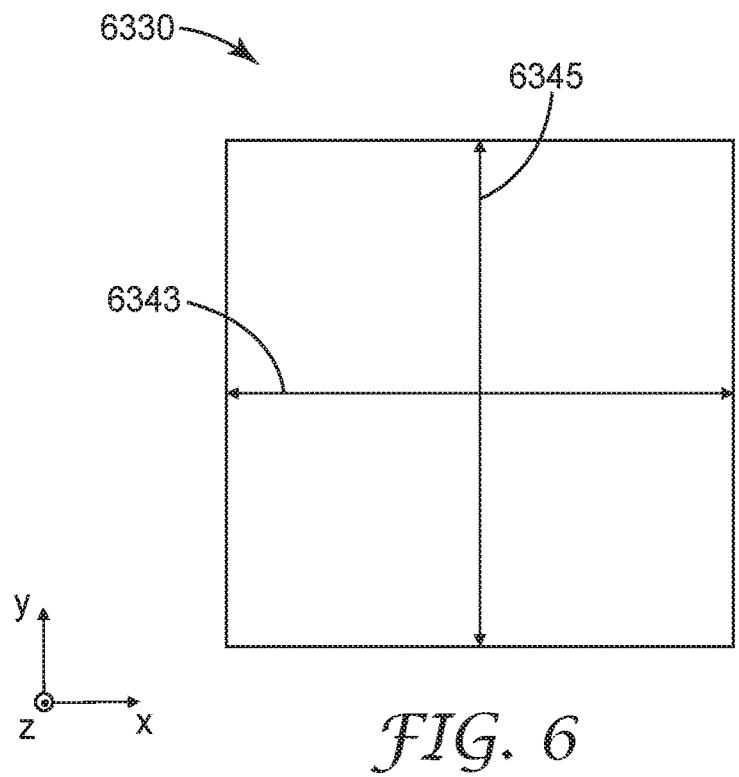
FIG. 6 is a schematic front view of a polarizer.

FIG. 1A is a schematic exploded cross-sectional view of optical lens 1000 which includes a first polarizer 200, a second polarizer 500, a partial reflector 400, a first phase retarder 300, and a second phase retarder 600. FIG. 1B is a schematic exploded cross-sectional view of optical lens 1000b which corresponds to optical lens 1000 except that the second polarizer 500 is replaced with a second polarizer 500b with pass and block axes oriented differently than that of second polarizer 500, and the second phase retarder 600 is replaced with a second phase retarder 600b having a fast axis oriented differently than that of second phase retarder 600. FIG. 1C is a schematic cross-sectional view of the optical lens 1000. The first polarizer 200 substantially transmits light having a first polarization state 210 and substantially blocks light having an orthogonal second polarization state 220. In some embodiments, the first and second polarization states 210 and 220 are linear polarization states and the first polarizer 200 has a block axis corresponding to the second polarization state 220 and a pass axis corresponding to the first polarization state 210. Pass and block axes of a polarizer are illustrated in FIG. 6 which is a schematic illustration of a polarizer 6330, which may correspond to either of the first and second polarizer 200 and 500, and which has a block axis 6343 and an orthogonal pass axis 6345. In some embodiments, the first and second polarization states are orthogonal circular polarization states. In the illustrated embodiment, the second polarization state 220 is a linear polarization state having an electric field parallel to the x-axis, referring to the x-y-z coordinate system illustrated in FIGS. 1A-1C.

A polarizer may be said to substantially transmit light having a first polarization state if at least 60 percent of light having the first polarization state in a desired plurality of wavelengths (e.g., a range of 400 nm to 700 nm) is transmitted through the polarizer. In some embodiments, at least 70 percent, or at least 80 percent, of light having the first polarization state in the desired plurality of wavelengths is transmitted through the polarizer. A polarizer may be said to substantially block light having a second polarization state if at least 60 percent of light having the second polarization state in a desired plurality of wavelengths (e.g., a range of 400 nm to 700 nm) is blocked from passing through the polarizer. In some embodiments, at least 70 percent, or at least 80 percent, of light having the second polarization state in the desired plurality of wavelengths is blocked from passing through the polarizer. The light can be blocked by being absorbed (e.g., using an absorbing polarizer such as an iodine stained polyvinyl alcohol polarizer) or by being reflected (e.g., using a wire grid polarizer or using an oriented multilayer polymeric reflective polarizer such as Dual Brightness Enhancement Film (DBEF) or Advanced Polarizing Film (APF—a substantially uniaxially oriented reflective polarizer), both available from 3M Company (St. Paul, Minn.)). A polarizer may be said to substantially reflect light having a second polarization state if at least 60 percent of light having the second polarization state in a desired plurality of wavelengths is reflected from the polarizer. The desired plurality of wavelengths may be the visible wavelength range of 400 nm to 700 nm, for example. Other wavelength ranges may also be used. For example, the desired plurality of wavelengths may include only a portion of the visible range (e.g., 450 nm to 680 nm). For example, the optical lens may be used in sunglasses, and a dyed layer may be included to block a portion of the blue range, for example. If the dye blocks a wavelength range of 380-450 nm, for example, the desired plurality of wavelengths may be 450 nm to 700 nm. As another example, in some embodiments, the optical lens may be used in a machine vision application and the desired plurality of wavelengths may be or include an infrared range, or may be or include an ultraviolet range.

In some embodiments, a polarizer used in the optical lenses of the present description (e.g., either one or both of first and second polarizers 200 and 500) is a multilayer optical film that, prior to being formed (e.g., thermoformed) into the desired shape for the optical lens, is substantially uniaxially oriented in that it has a degree of uniaxial character U of at least 0.7, or at least 0.8, or at least 0.85, where $U=(1/MDDR-1)/(TDDR^{1/2}-1)$ with MDDR defined as the machine direction draw ratio and TDDR defined as the transverse direction draw ratio. Such substantially uniaxially oriented multilayer optical films are described in U.S. Pat. No. 2010/0254002 (Merrill et al.) and may include a plurality of alternating first and second polymeric layers with the first polymeric layers having indices of refraction in a length direction (e.g., x-direction) and a thickness direction (e.g., z-direction) that are substantially the same, but substantially different from an index of refraction in a width direction (e.g., y-direction). For example, the absolute value of the difference in the refractive indices in the x- and z-directions may be less than 0.02 or less than 0.01, and the absolute value of the difference in the refractive indices in the x- and y-directions may be greater than 0.05, or greater than 0.10. Unless specified differently, refractive index refers to the refractive index at a wavelength of 550 nm.

The phase retarders (e.g., first and/or second phase retarders 300 and 600) used in the optical lenses of the present description can be films or coatings. Suitable coatings for forming a phase retarder include the linear photopolymerizable polymer (LPP) materials and the liquid crystal polymer (LCP) materials described in US Pat. App. Pub. Nos. US 2002/0180916 (Schadt et al.), US 2003/028048 (Cherkaoui et al.) and US 2005/0072959 (Moia et al.). Suitable LPP materials include ROP-131 EXP 306 LPP and suitable LCP materials include ROF-5185 EXP 410 LCP, both available from Rolic Technologies, Allschwil, Switzerland. Either or both of the phase retarders may be quarter-wave retarders at at least one wavelength in the desired plurality of wavelengths.

The partial reflector (e.g., partial reflector 400) used in the optical lenses of the present description may be any suitable partial reflector. For example, the partial reflectors may be constructed by coating a thin layer of a metal (e.g., silver or aluminum) on a transparent substrate. The partial reflector may also be formed by depositing thin-film dielectric coatings onto a surface of a lens substrate (e.g., first major surface 110 of substrate 100), or by depositing a combination of metallic and dielectric coatings on the surface, for example. In some embodiments, the partial reflector has an average optical reflectance and an average optical transmittance in the desired plurality of wavelengths that are each in a range of 30% to 70%, or each in a range of 40% to 60%, or each in a range of 45% to 55%. The partial reflector may be a half mirror, for example.

The second polarizer 500 substantially transmits light having a third polarization state 510 and substantially reflects light having an orthogonal fourth polarization state 520. In some embodiments, the first polarization state 210 is substantially parallel to the third polarization state 510, and in some embodiments, the second polarization state 220 is substantially parallel to the fourth polarization state 520. In other embodiments, the first polarization state is substantially perpendicular to the third polarization state, and the second polarization state is substantially perpendicular to the fourth polarization state. In still other embodiments, the first and third polarization states may be neither parallel nor perpendicular, and similarly the second and fourth polarization states may be neither parallel nor perpendicular. This can occur due to alignment errors, for example, or due to rotation or the pass and/or block axes when the polarizer(s) are formed onto a curved surface, for example. In such cases, an additional polarizer (e.g., an absorptive polarizer) may be disposed between the viewer and the second polarizer. The additional polarizer can function as a clean-up polarizer that blocks light that undesirably leaks through the second polarizer. The partial reflector 400 is disposed between the first and second polarizers 200 and 500 and has an average optical reflectance of at least 30% for a desired plurality of wavelengths. The first phase retarder 300 is disposed between the first polarizer 200 and the partial reflector 400 for changing a polarization state of light passing therethrough. The second phase retarder 600 is disposed between the partial reflector 400 and the second polarizer 500 for changing a polarization state of light passing therethrough.

In the embodiment illustrated in FIG. 1A, unpolarized light 1401 is incident on optical lens 1000 and the portion of the light having the first polarization state 210 is transmitted through first polarizer 200 as linearly polarized light 1404 which has the first polarization stated 210. Linearly polarized light 1404 is then transmitted through the first phase retarder 300 as circularly polarized light 1406 a portion of which is transmitted through the partial reflector 400 and then through the substrate 100 and through second phase retarder 600 as linearly polarized light 1408. Linearly polarized light 1408 has the fourth polarization state 520 and is reflected from the second polarizer 500 and then transmitted through the second phase retarder 600 as circularly polarized light 1410 which is transmitted through the substrate 100 and a portion of which is reflected from partial reflector 400 as circularly polarized light 1412 which is transmitted through second phase retarder 600 as linearly polarized light 1414. Linearly polarized light 1414 has the third polarization state 510 and is transmitted through the second polarizer 500 to the viewer 1050. Circularly polarized light 1412 has a polarization state 512 and circularly polarized light 1406 has an orthogonal polarization state 522. In the illustrated embodiment, each of the first and second polarizers 200 and 500 are linear polarizers. The combination of the second phase retarder 600 and second polarizer 500 (optical stack 350 depicted in FIG. 1C) is a polarizer substantially transmitting light having a third polarization state (polarization state 512) and substantially reflecting light having an orthogonal fourth polarization state (polarization state 522).

In other embodiments, the light rays have differing polarization states at differing points in the light path due to differing orientations of the first and second polarization states 210 and 220 relative to the orientations of the third and fourth polarization states 510 and 520, for example, or due to differing retardances or relative orientations of the fast axes of the first and second phase retarders 300 and 600, for example.

Figure 7:
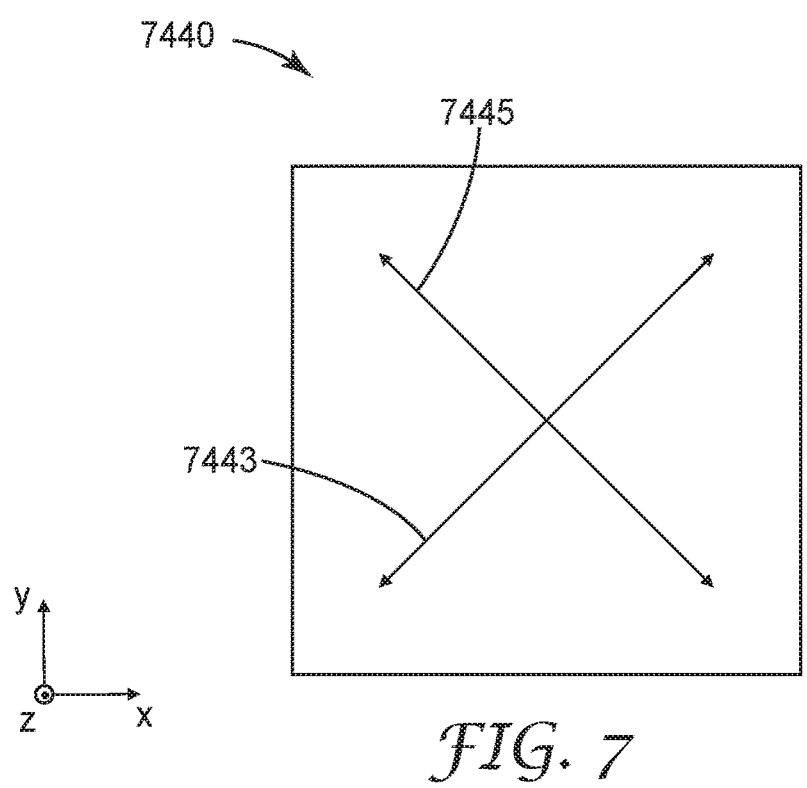
FIG. 7 is a schematic front view of phase retarder.

Either or both of the first and second phase retarders 300 and 600 may be quarter-wave retarders at at least one wavelength in the desired plurality of wavelengths. Either or both of the first and second phase retarders 300 and 600 may have orthogonal fast and slow axes. FIG. 7 is a schematic front view of phase retarder 7440, which may correspond to either of the first and second phase retarders 300 and 600, and which has a fast axis 7443 and an orthogonal slow axis 7445. In some embodiments, the fast axes of the first and second phase retarders 300 and 600 are substantially parallel to each other (e.g., both oriented as in FIG. 7), and in other embodiments, the fast axes of the first and second phase retarders 300 and 600 are substantially perpendicular to each other (e.g., one oriented as in FIG. 7 and the other rotated 90 degrees about the z-axis). Directions (e.g., along axes or corresponding to polarization states) may be described as substantially parallel or substantially perpendicular if the directions are within 10 degrees of parallel or perpendicular, respectively. In some embodiments, substantially parallel or perpendicular directions are within 5 degrees, or 3 degrees of being parallel or perpendicular, respectively.

In some embodiments, the phase retarder 7440 is a quarter-wave retarder. In some embodiments second phase retarder 600 has a retardance less than quarter wave and a third phase retarder is disposed between the second phase retarder 600 and the partial reflector 400. For example, a third phase retarder may be disposed on the first major surface 110. The third phase retarder may correspond to phase retarder 7440 and the second phase retarder 600 may also correspond to phase retarder 7440 with the fast axes of the second and third phase retarders substantially parallel to each other. The retardance of the second and third phase retarders may add to a quarter of a visible light wavelength (e.g., a total retardance of 125 nm to 150 nm). In some embodiments, each of the second and third phase retarders are eight-wave retarders.

In some embodiments, the first polarization state 210 is substantially parallel to the third polarization state 510, and each of the first and second phase retarders 300 and 600 have orthogonal fast and slow axes with the fast axes of the first and second phase retarders 300 and 600 being substantially parallel to each other. For example, first and second phase retarders 300 and 600 may each correspond to phase retarder 7440 with fast axis 7443 and slow axis 7445 oriented as shown in FIG. 7. In some embodiments, quarter-wave retarders are utilized for both the first and the second phase retarders 300 and 600 with the fast axis of the first phase retarder parallel to the fast axis of the second phase retarder and at about 45 degrees from the pass axis of the first polarizer 200. In this case, when the first and second polarizers 200 and 500 are disposed such that the first polarization state 210 (pass state for the first polarizer 200) is orthogonal to the fourth polarization state 520 (block state for second polarizer 500), light which passes through first polarizer 200 is first incident on second polarizer 500 in the block state.

In some embodiments, the optical lens 1000 has an optical axis 1010 such that a light ray 1035 propagating along the optical axis 1010 passes through the optical lens 1000 without being substantially refracted. Optical lens 1000 has a thickness T1 along the optical axis 1010. A light ray may be described as not being substantially refracted as it passes through a surface or a component if the light ray changes direction by less than 10 degrees upon passing through the surface or component. In some embodiments, a light ray which is not substantially refracted as it passes through a surface or a component changes direction by less than 5 degrees, or less than 1 degree upon passing through the surface or component.

FIG. 1B shows optical lens 1000*b* which corresponds to optical lens 1000 except that the second phase retarder 600*b* and the second polarizer 500*b* are rotated about the optical axis 1010 such that the third polarization state 510*b*, which is transmitted through the second polarizer 500*b*, is perpendicular to the first polarization state 210 and the fourth polarization state 520*b*, which is reflected from the second polarizer 500*b*, is perpendicular to the second polarization state 220. In FIG. 1B, circularly polarized light 1406 is transmitted through second phase retarder 600*b* as linearly polarized light 1408*b* which has the fourth polarization state 520*b* and which is reflected from the second polarizer 500*b* and transmitted through the second phase retarder 600*b* as circularly polarized light 1410 which is transmitted through the substrate 100 and a portion of which is reflected from partial reflector 400 as circularly polarized light 1412 which is transmitted through second phase retarder 600*b* as linearly polarized light 1414*b*. Linearly polarized light 1414*b* has the third polarization state 510*b* and is transmitted through the second polarizer 500*b* to the viewer 1050.

In some embodiments, the first polarization state 210 is substantially perpendicular to the third polarization state 510*b*, and each of the first and second phase retarders 300 and 600*b* have orthogonal fast and slow axes with the fast axes of the first and second phase retarders 300 and 600*b* being substantially perpendicular to each other. For example, first phase retarder 300 may correspond to phase retarder 7440 with fast axis 7443 and slow axis 7445 oriented as shown in FIG. 7 while second phase retarder 600*b* may correspond to phase retarder 7440 rotated 90 degrees about the z-axis. In some embodiments, quarter-wave retarders are utilized for both the first and the second phase retarders 300 and 600*b* with the fast axis of the first phase retarder 300 perpendicular to the fast axis of the second phase retarder 600*b* and at about 45 degrees from the pass axis of the first polarizer 200. In this case, when the first and second polarizers 200 and 500*b* are disposed such that the first polarization state 210 (pass state for the first polarizer 200) is substantially parallel to the fourth polarization state 520*b* (block state for second polarizer 500*b*), light which passes through first polarizer 200 is first incident on second polarizer 500*b* in the block state. In some embodiments, one or both of the first and second phase retarders 300 and 600*b* have a retardance less than quarter wave. For example, in some embodiments, the second phase retarder is an eighth-wave retarder and a third phase retarder is disposed between the partial reflector 400 and the second phase retarder 600*b*. The third phase retarder may be an eighth-wave retarder aligned with the second phase retarder 600*b* such that the combined retardance of the second and third phase retarders is a quarter of a wavelength in the desired plurality of wavelengths.

In some cases, it is desired that light transmitted through the first polarizer 200 is first incident on second polarizer 500 or 500*b* in the block state so that it is then reflected from the second polarizer, transmitted through the second phase retarder 600 or 600*b*, transmitted through the substrate 100, reflected from partial reflector 400, transmitted back through the substrate 100 and second phase retarder 600 or 600*b* and is then incident of second polarizer 500 in the pass state. This can be achieved, for example, by disposing the first and second polarizers 200 and 500 and the first and second phase retarders 300 and 600 such that the first polarization state 210 is substantially parallel to the third polarization state 510 and the fast axes of the first and second phase retarders 300 and 600 are substantially parallel to each other; or by disposing the first and second polarizers 200 and 500*b* and the first and second phase retarders 300 and 600*b* such that the first polarization state 210 is substantially perpendicular to the third polarization state 510*b* and the fast axes of the first and second phase retarders 300 and 600*b* are substantially perpendicular to each other. In other cases, it is desired that a portion of light transmitted through the first polarizer 200 is first incident on the second polarizer 500 or 500*b* in the pass state and another portion of light transmitted through the first polarizer 200 is first incident on the second polarizer 500 or 500*b* in the block state. This allows two different focal lengths or optical power to be presented to the viewer 1050 as discussed further elsewhere herein. This can be achieved by having the first and second polarization states 210 and 220 an angle between zero and 90 degrees (e.g., 45 degrees) to the third and fourth polarization states, respectively, or by utilizing first and second phase retarders having fast axes at an angle between zero and 90 degrees (e.g., 45 degrees) to each other or having retardances differing from quarter wave. A folded optical path through a lens refers to a light path through a lens where the light undergoes two reflections before passing through the lens. A direct optical path refers to a light path through the lens where the light does not undergo reflection before passing through the lens. In some embodiments, an optical lens of the present description provides a folded optical path through the optical lens and not a direct optical path. In other embodiments, as described further elsewhere herein, an optical lens of the present description provides both a folded optical path and a direct optical path through the optical lens. An optical lens may be a bi-focal optical lens by virtue of having different focal lengths or optical powers for light following a folded optical path and for light following a direct optical path.

In the illustrated embodiment, the optical lens 1000 includes a substrate 100 disposed between the partial reflector 400 and the second phase retarder 600. In some embodiments, the substrate has an average optical transmittance of at least 80%, or at least 90%, in the desired plurality of wavelengths. In some embodiments, the substrate 100 has a first major surface 110 configured to face away from a viewer 1050 and an opposite second major surface 120 configured to face toward the viewer. In some embodiments, the first polarizer 200 is disposed on the first major surface 110 of the substrate 100, and the second polarizer 500 is disposed on the second major surface 120 of the substrate 100. A combination of layers including the first polarizer 200, the first phase retarder 300 and the partial reflector 400 may be referred to as a first optical stack 250.

In some embodiments, first optical stack 250 includes additional layers, such as an adhesive layer between any two other layers in the first optical stack 250 or an adhesive layer used to laminate the partial reflector 400 to first major surface 110 of the substrate 100. In some embodiments, the partial reflector 400 is deposited on the first major surface 110 without the use of an adhesive (e.g., via sputtering). A combination of layers including the second phase retarder 600 and the second polarizer 500 may be referred to as a second optical stack 350. In some embodiments, second optical stack 350 includes additional layers, such as an adhesive layer between any two other layers in the second optical stack 350 or an adhesive layer used to laminate the second phase retarder 600 to the second major surface 120 of the substrate 100.

In some embodiments, no adhesive layer is included. For example, first phase retarder 300 can be coated onto first polarizer 200 and partial reflector 400 can be deposited onto the first phase retarder 300 to form the first optical stack 250, and second phase retarder 600 can be coated onto second polarizer 500 to form second optical stack 350. The first and second optical stacks 250 and 350 can be formed under temperature and/or pressure (e.g., thermoforming) to have a desired shape. The substrate 100 can be formed between the first and second optical stacks 250 and 350 in an insert molding process, for example. Alternatively, the substrate 100 can be formed first (e.g., by molding or machining) and then the various layers of the first and second optical stacks 250 and 350 can be deposited or laminated onto the first and second major surfaces 110 and 120 of the substrate 100.

A major surface which is not an outermost major surface of the optical lens 1000 may be described as an internal major surface. First and second major surfaces 110 and 120 are internal major surfaces as are each major surface of the first and second phase retarders 300 and 600, the major surface of the first polarizer 200 which faces the first phase retarder 300, and the major surface of the second polarizer 500 which faces the second phase retarder 600. In some embodiments, at least one of the first polarizer 200, the second polarizer 500, the partial reflector 400, the first phase retarder 300 and the second phase retarder 600 is laminated to an adjacent first internal major surface of the optical lens 1000 via an adhesive. In some embodiments, at least one of the first polarizer 200, the second polarizer 500, the partial reflector 400, the first phase retarder 300 and the second phase retarder 600 is formed directly on an adjacent second internal major surface of the optical lens 1000. For example, a phase retarder can be formed directly on a surface by coating an LCP or LPP material on the surface as described further elsewhere herein. In some embodiments, at least one of the first polarizer 200, the second polarizer 500, the partial reflector 400, the first phase retarder 300 and the second phase retarder 600 is formed directly on an adjacent first internal major surface of the optical lens 1000, and at least one other of the first polarizer 200, the second polarizer 500, the partial reflector 400, the first phase retarder 300 and the second phase retarder 600 is formed directly on an adjacent second internal major surface of the optical lens 1000.

In some embodiments, alternative arrangements of the various layers are utilized. For example, the second phase retarder 600 can be positioned between the partial reflector 400 and the first major surface 110. In this case, the second phase retarder 600 can be considered to be part of the first optical stack 250 instead of the second optical stack 350.

It is typically desired for the partial reflector 400 and the second polarizer 500 to be on opposite sides of the substrate 100 to give a desired length to the folded optical path between the partial reflector 400 and the second polarizer 500. However, in some embodiments, the partial reflector 400 and the second polarizer 500 may be disposed on a same side of the substrate 100, and in still other embodiments, the substrate 100 may be omitted.

In some embodiments, the optical lens is oriented with the first polarizer facing the viewer and the second polarizer facing away from the viewer. FIG. 14A is a schematic exploded cross-sectional view of optical lens 7000 which includes a first polarizer 7200, a second polarizer 7500, a partial reflector 7400, a first phase retarder 7300, and a second phase retarder 7600. FIG. 14B is a schematic cross-sectional view of the optical lens 7000. The first polarizer 7200 substantially transmits light having a first polarization state 7210 and substantially blocks light having an orthogonal second polarization state 7220. The second polarizer 7500 substantially transmits light having a third polarization state 7510 and substantially reflects light having an orthogonal fourth polarization state 7520. In the illustrated embodiment, the first and third polarization states 7210 and 7510 are substantially parallel, the second and the fourth polarization states 7220 and 7520 are substantially parallel, and the fast axes of the first and second phase retarders 7300 and 7600 are substantially parallel. In other embodiments, the first and third polarization states 7210 and 7510 are substantially perpendicular, the second and the fourth polarization states 7220 and 7520 are substantially perpendicular, and the fast axes of the first and second phase retarders 7300 and 7600 are substantially perpendicular.

Unpolarized light ray 702 is incident on second polarizer 7500 and a portion the light ray 702 passes through the second polarizer 7500 as polarized light 704 which has the third polarization state 7510. Light 704 is transmitted through optical substrate 7100, which has a first major surface 7110 configured to face away from a viewer 7050 and an opposite second major surface 7120 configured to face toward the viewer 7050, and then through second phase retarder 7600 as circularly polarized light 710 which has polarization state 711. A portion of circularly polarized light 710 is reflected from the partial reflector 7400 back through the second phase retarder 7600 and through the substrate 7100 to the second polarizer 7500. It is then reflected from the second polarizer 7500 and is transmitted through the substrate 7100 and through the second phase retarder 7600 as circularly polarized light 712 which has polarization state 713. Another portion of the circularly polarized light 710 is transmitted through the partial reflector 7400 and the first phase retarder 7300 as polarized light 708 having the second polarization state 7220. Polarized light 708 is blocked by first polarizer 7200. In some embodiments, first polarizer 7200 is an absorbing polarizer which blocks polarized light 708 by absorbing it. In other embodiments, first polarizer 7200 may be a reflective polarizer which block light 708 be reflecting it. Circularly polarized light 712 is transmitted through the partial reflector 7400, the first phase retarder 7300 as polarized light 714 which has the first polarization state 7210 and is transmitted through the first polarizer 7200 to the viewer 7050.

In the illustrated embodiment, each of the first and second polarizers 7200 and 7500 are linear polarizers. The combination of the first phase retarder 7300 and first polarizer 7200 is a polarizer substantially transmitting light having a first polarization state (polarization state 711) and substantially blocking light having an orthogonal second polarization state (polarization state 713).

In alternate embodiments, the second phase retarder 7600 and the second polarizer 7500 are rotated about the optical axis 7010 (see FIG. 14B) in a manner similar to that shown in FIG. 1B such that the third polarization state 7510, which is transmitted through the second polarizer 7500, is perpendicular to the first polarization state 7210 and the fourth polarization state 7520, which is reflected from the second polarizer 7500, is perpendicular to the second polarization state 7220.

FIG. 14B is a schematic cross-sectional view of lens 7000. First optical stack 7250 is disposed on first major surface 7110 and includes the second polarizer 7500 and may optionally include additional layers such as an optically clear adhesive layer. Second optical stack 7350 is disposed on second major surface 7120 and includes the second phase retarder 7600, the partial reflector 7400, the first phase retarder 7300, and the first polarizer 7200 and may optionally include additional layers such as an optically clear adhesive layer. In some embodiments, the optical lens 7000 has an optical axis 7010 such that a light ray 7035 propagating along the optical axis 7010 passes through the optical lens 7000 without being substantially refracted. Optical lens 7000 has a thickness T1 along the optical axis 7010. In the embodiment illustrated in FIG. 14B, each of the first polarizer 7200, the first phase retarder 7300, the partial reflector 7400, and the second phase retarder 7600 substantially conforms to the second major surface 7120 of the substrate 7100, and the second polarizer 7500 substantially conforms to the first major surface 7110 of the substrate 7100.

The substrate of any of the optical lenses of the present description, such as optical lens 100, can be made from any material used in lens substrates. For example, the substrate 100 can be a polycarbonate or a glass substrate. In some embodiments, the substrate 100 is a single unitary substrate and in other embodiments, the substrate 100 includes two or more components which may, for example, be bonded together with an optically clear adhesive. In some embodiments, the two or more components can be made from two or more different materials having different refractive indices (e.g., a polymer and a glass).

Figure 8:
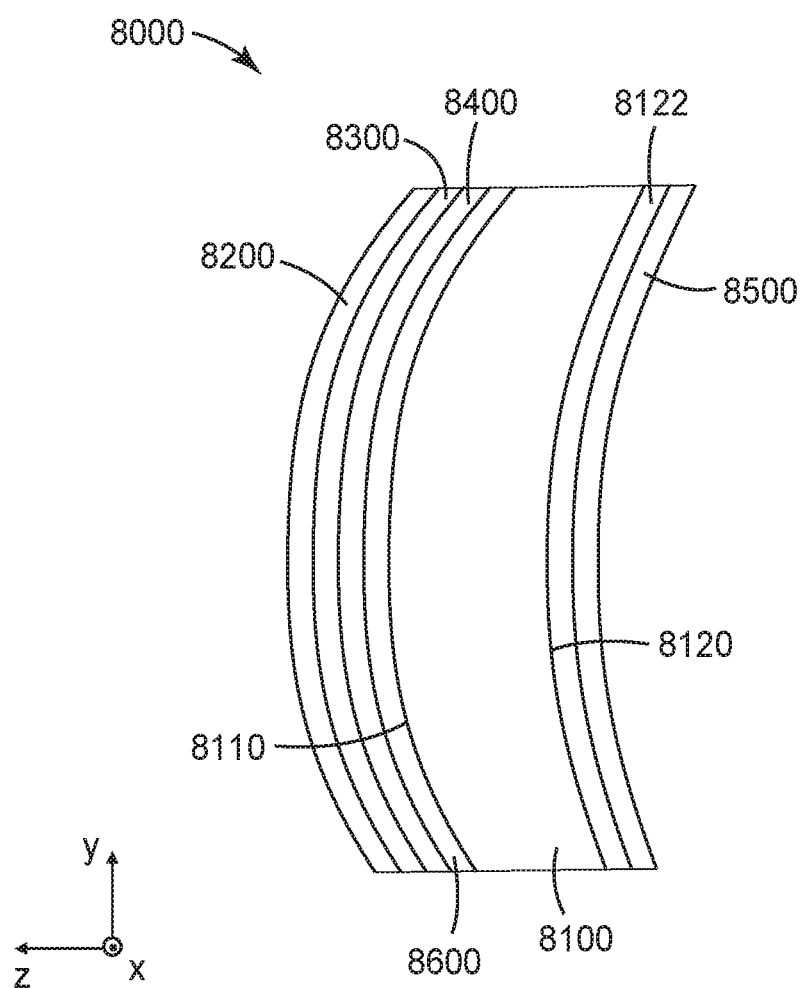
FIGS. 8-10 are schematic cross-sectional views of optical lenses.

FIG. 8 is a schematic cross-sectional view of optical lens 8000 including substrate 8100 having opposing first and second major surfaces 8110 and 8120. A first polarizer 8200, a first phase retarder 8300, a partial reflector 8400, and a second phase retarder 8600 are disposed on first major surface 8110; and a second polarizer 8500 is disposed on the second major surface 8120. The first polarizer 8200, the first phase retarder 8300, the partial reflector 8400, the second phase retarder 8600, and the second polarizer 8500 may correspond to the first polarizer 200, the first phase retarder 300, the partial reflector 400, the second phase retarder 600 (or 600b), and the second polarizer 500 (or 500b), respectively, for example. Second polarizer 8500 is laminated to second major surface 8120 through adhesive layer 8122. In some embodiments, second phase retarder 8600 is formed directly on first major surface 8110. Second major surface 8120 may be described as an internal major surface of the optical lens 8000 adjacent the second polarizer 8500 and first major surface 8110 may be described as an internal major surface of the optical lens 8000 adjacent the second phase retarder 8600. Other optical lenses with or without adhesives between adjacent internal major surfaces are also envisioned. The optical lens 1000 is a single piece configured for use in an eyewear (for example, the pair of glasses 1100 depicted in FIG. 3). In some embodiments, an optical lens of the present description may be a single piece by virtue of at least one of the first polarizer, the second polarizer, the partial reflector, the first phase retarder and the second phase retarder being laminated to an adjacent first internal major surface of the optical lens via an adhesive, and at least one of the first polarizer, the second polarizer, the partial reflector, the first phase retarder and the second phase retarder being formed directly on an adjacent second internal major surface of the optical lens. In some embodiments, an optical lens of the present description may be a single piece by virtue of at least one of the first polarizer, the second polarizer, the partial reflector, the first phase retarder and the second phase retarder being formed directly on a first internal major surface of the optical lens, and at least one of the first polarizer, the second polarizer, the partial reflector, the first phase retarder and the second phase retarder being formed directly on an adjacent second internal major surface of the optical lens.

In the embodiment illustrated in FIG. 8, each of the first polarizer 8200, the first phase retarder 8300, and the partial reflector 8400 and the second phase retarder 8600 substantially conforms to the first major surface 8110 of the substrate 8100; and the second polarizer 8500 substantially conforms to the second major surface of the substrate. In the embodiment illustrated in FIG. 1C, each of the first polarizer 200, the first phase retarder 300, and the partial reflector 400 substantially conforms to the first major surface 110 of the substrate 100; and each of the second polarizer 500 and the second phase retarder 600 substantially conforms to the second major surface 120 of the substrate 100. A phase retarder, polarizer or film may be said to substantially conform to a surface if it nominally conforms to the surface but may differ in shape from the surface due to ordinary manufacturing variations (e.g., manufacturing variations leading to variations in thickness of various layers, for example).

In some embodiments, at least one of the first and second major surfaces 110 and 120 of the substrate 100 is curved. In some embodiments, the first and second major surfaces 110 and 120 of the substrate 100 are curved and parallel to each other. In other embodiments, the first and second major surfaces 110 and 120 of the substrate 100 are curved and non-parallel to each other. In some embodiments, the first and second major surfaces 110 and 120 of the substrate 100 curve toward each other, and in some embodiments, the first and second major surfaces 110 and 120 of the substrate 100 curve away from each other.

In some embodiments, the first polarizer 200, or an optical stack 250 including the first polarizer, conforms or substantially conforms to the shape of the first major surface 110, and in some embodiments, the second polarizer 500 or 500b, or an optical stack 350 including the second polarizer, conforms or substantially conforms to the shape of the second major surface 120. In other embodiments, the first polarizer 200 curves away from or towards the first major surface 110, and/or the second polarizer 500 or 500b curves away from or towards the second major surface 120. For example, the first polarizer 200, or an optical stack 250 including the first polarizer, can be formed into a curved shape different from that of the first major surface 110 and then laminated to the first major surface 110 with an adhesive. Similarly, in some embodiments, the second polarizer 500 or 500b, or an optical stack 350 including the second polarizer, can be formed into a curved shape different from that of the second major surface 120 and then laminated to the second major surface 120 with an adhesive. In some embodiments, the first and second major surfaces 110 and 120 of the substrate 100 curve away from the first polarizer 200, and in some embodiments, the first and second major surfaces 110 and 120 of the substrate 100 curve toward the first polarizer 200.

Figure 9:
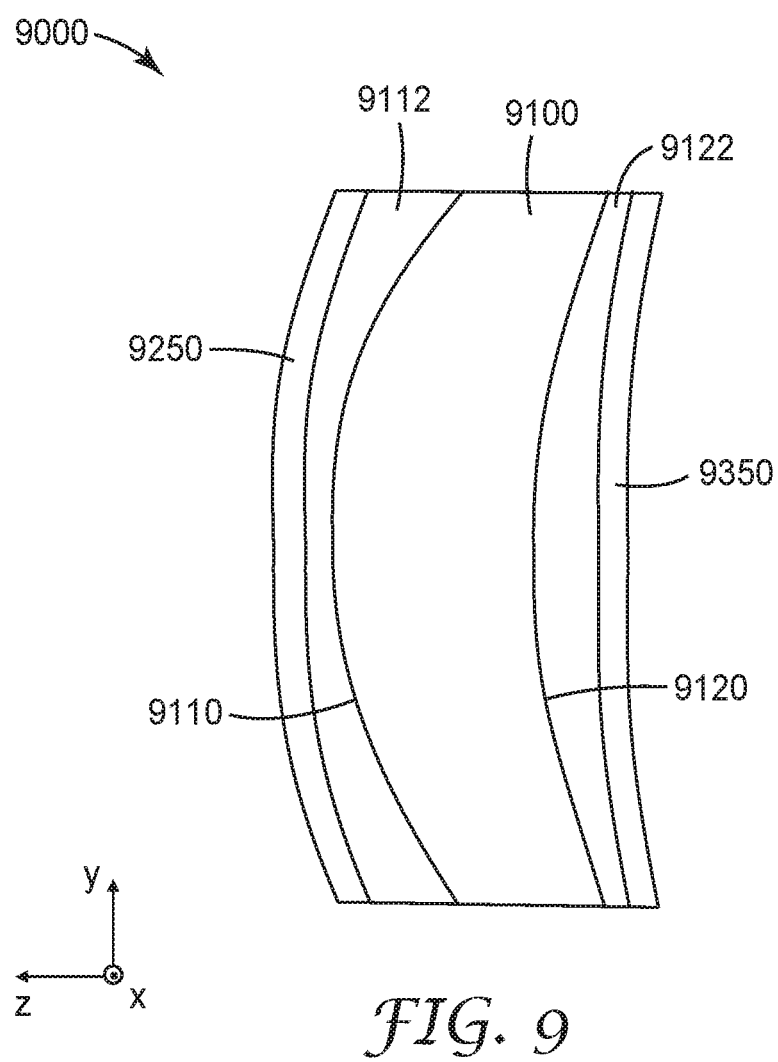

FIG. 9 is a schematic cross-sectional view of optical lens 9000 including a substrate 9100 having opposing first and second major surfaces 9110 and 9120. Optical lens 9000 includes first optical stack 9250 disposed on first major surface 9110 and a second optical stack 9350 disposed on second major surface 9120. Each of the first and second optical stacks 9250 and 9350 includes a polarizer. The first and second optical stacks 9250 and 9350 may correspond to any of the first and second optical stacks described elsewhere herein. For example, the first and second optical stacks 9250 and 9350 may correspond to first and second optical stacks 250 and 350, or to first and second optical stacks 7250 and 7350. The first optical stack 9250 is attached to first major surface 9110 through layer 9112 which may be an adhesive layer, and the second optical stack 9350 is attached to the second major surface 9120 through layer 9122 which may be an adhesive layer. In the illustrated embodiment, the first and second major surfaces 9110 and 9120 curve away from the first polarizer in first optical stack 9250, the first and second major surfaces 9110 and 9120 curve toward the second polarizer in second optical stack 9350, and the first and second major surfaces 9110 and 9120 curve towards each other.

Figure 10:
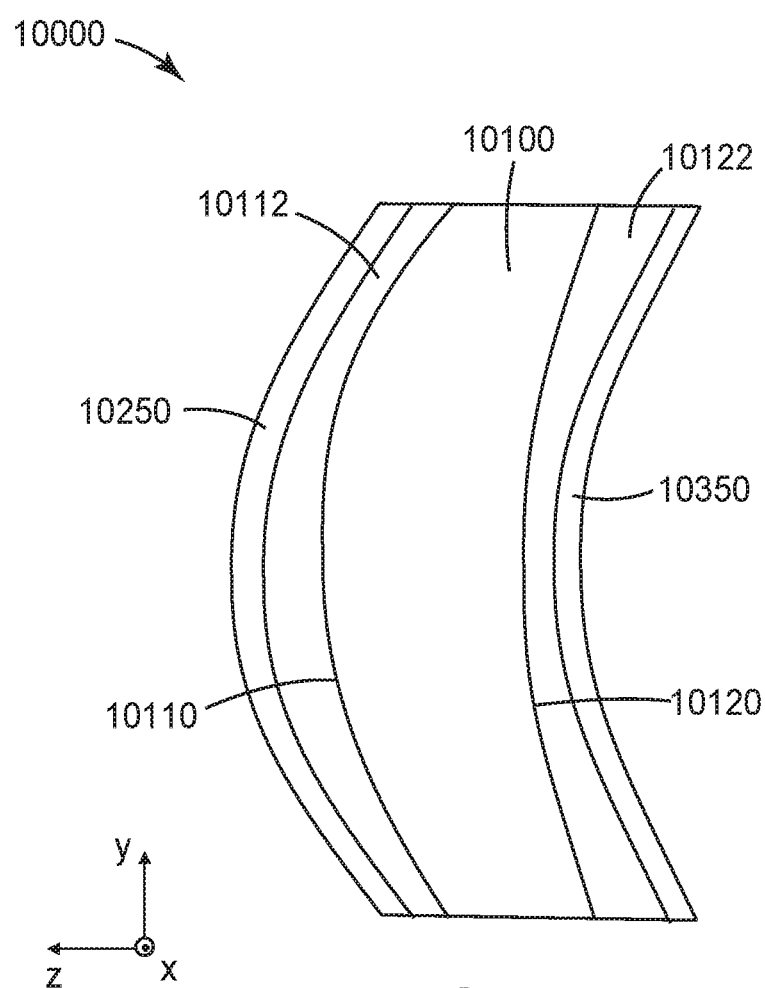

FIG. 10 is a schematic cross-sectional view of optical lens 10000 including a substrate 10100 having opposing first and second major surfaces 10110 and 10120. Optical lens 10000 includes first optical stack 10250 disposed on first major surface 10110 and a second optical stack 10350 disposed on second major surface 10120. Each of the first and second optical stacks 10250 and 10350 includes a polarizer. The first and second optical stacks 10250 and 10350 may correspond to any of the first and second optical stacks described elsewhere herein. For example, the first and second optical stacks 10250 and 10350 may correspond to first and second optical stacks 250 and 350, or to first and second optical stacks 7250 and 7350. The first optical stack

10250 is attached to first major surface 10110 through layer 10112 which may be an adhesive layer, and the second optical stack 10350 is attached to the second major surface 10120 through layer 10122 which may be an adhesive layer. In the illustrated embodiment, the first and second major surfaces 10110 and 10120 curve towards the first polarizer in first optical stack 10250, the first and second major surfaces 10110 and 10120 curve away from the second polarizer in second optical stack 10350, and the first and second major surfaces 10110 and 10120 curve towards each other.

In other embodiments, the first and/or second major surfaces of the substrate may be parallel to or curve towards or away from the first polarizer and/or the second polarizer, and the first and/or second major surfaces of the substrate may be parallel to or curve towards or away from each other.

Figure 11:
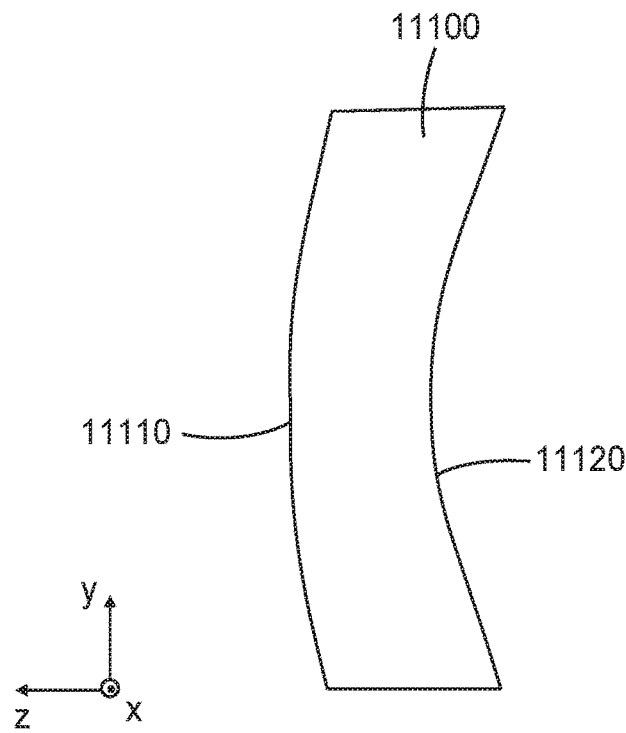
FIGS. 11-13 are schematic cross-sectional views of substrates.
Figure 12:
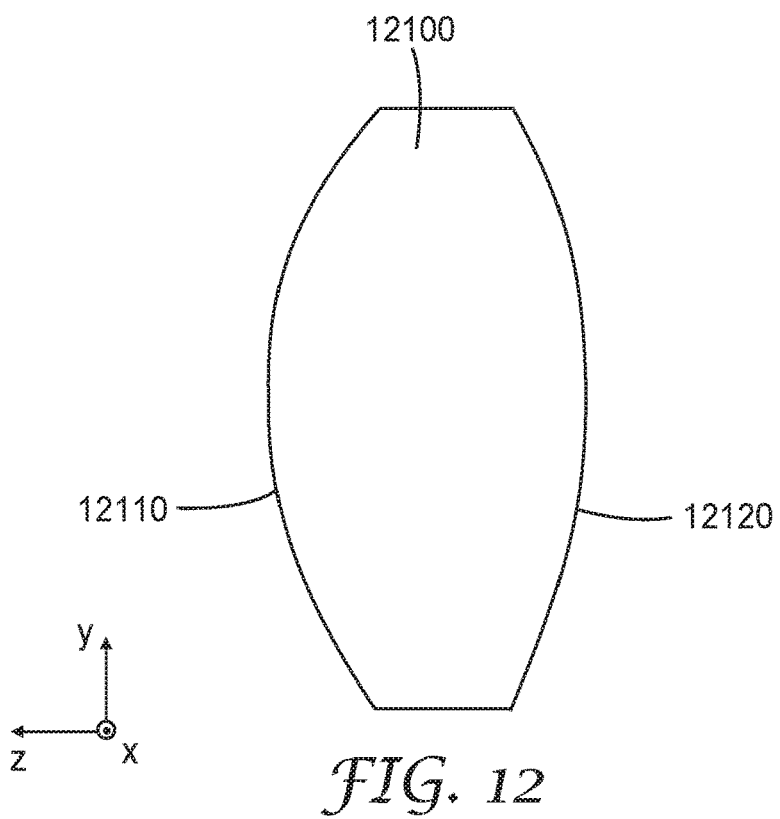
Figure 13:
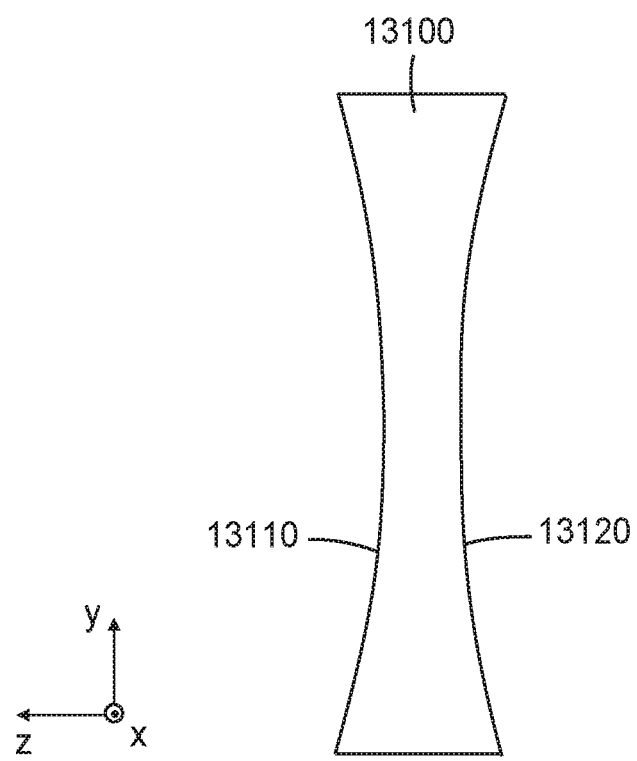

FIG. 11 is a schematic cross-sectional view of substrate 11100 which has opposing first and second major surfaces 11110 and 11120 which curve away from each other. FIG. 12 is a schematic cross-sectional view of substrate 12100 which has opposing first and second major surfaces 12110 and 12120 which curve towards one another. FIG. 13 is a schematic cross-sectional view of substrate 13100 which has opposing first and second major surfaces 13110 and 13120 which curve away from each other. Any of substrates 11100, 12100 and 13100 can be used in any of the optical lenses of the present description. For example, substrate 11100, 12100 or 13100 can be used in place of substrate 100 in optical lens 1000. In still other embodiments, the lens substrate may have first and second major surfaces which curve towards each other in some regions and curve away from each other in other regions of the substrate. Such substrates can be used bi-focal, tri-focal and progressive lenses, for example.

Figure 2:
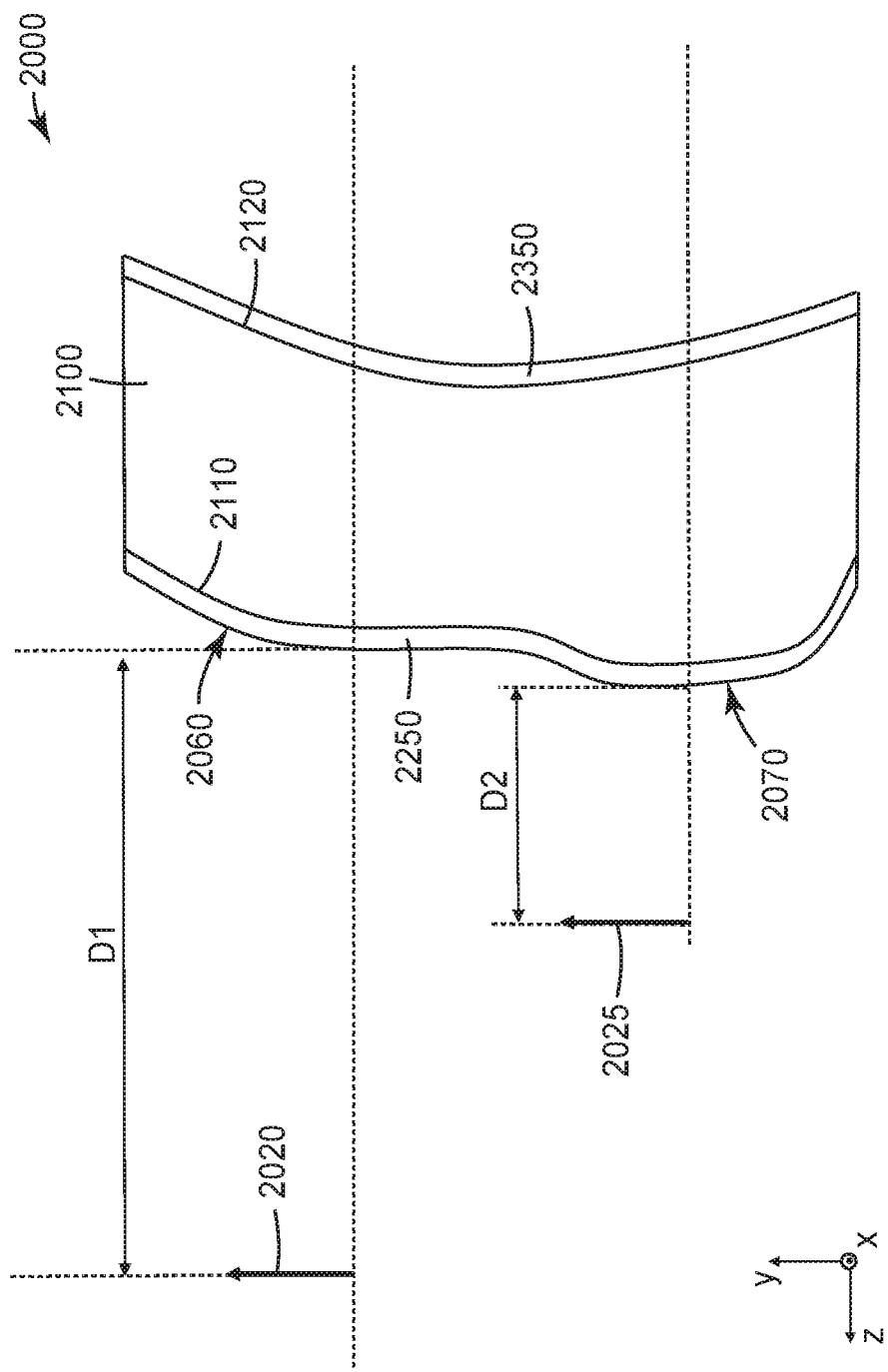
FIG. 2 is a schematic cross-sectional view of an optical lens.

FIG. 2 is a schematic cross-sectional view of optical lens 2000 including substrate 2100 with first and second optical stacks 2250 and 2350 disposed on opposing first and second major surfaces 2110 and 2120 of the substrate 2100. In some embodiments, first optical stack 2250 includes a first polarizer substantially transmitting light having a first polarization state and substantially blocking light having an orthogonal second polarization state and second optical stack 2350 includes a second polarizer substantially transmitting light having a third polarization state and substantially reflecting light having an orthogonal fourth polarization state. First optical stack 2250 may correspond to first optical stack 250, for example, and second optical stack 2350 may correspond to second optical stack 350, for example. In other embodiments, first optical stack 2250 includes the second polarizer and second optical stack 2350 includes the first polarizer. First optical stack 2250 may correspond to first optical stack 7250, for example, and second optical stack 2350 may correspond to second optical stack 7350, for example. Optical lens 2000 includes a first region 2060 for viewing an object 2020 at a greater first distance D1 from the optical lens 2000 and a second region 2070 for viewing an object 2025 at a smaller second distance D2 from the optical lens 2000. Optical lens 2000 may be a bi-focal, a tri-focal or a progressive lens. In other embodiments, the first and second optical stacks 2250 and 2350 may be included only on portions of the first and second major surfaces 2110 and 2120. For example, the first and second optical stacks 2250 and 2350 may be disposed only in the second region 2070 of the optical lens 2000 or may be disposed only in the first region 2060 of the optical lens 2000.

Figure 3:
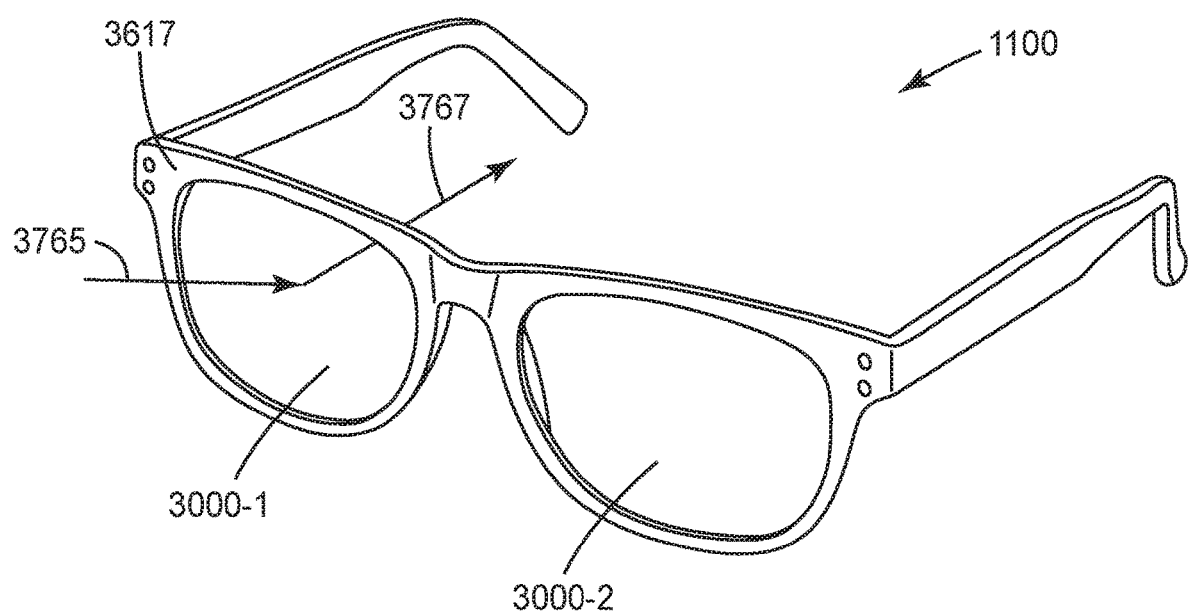
FIG. 3 is a schematic perspective view of a pair of glasses.

In some aspects of the present description, eyewear, such as a pair of glasses (also referred to as eyeglasses), may include at least one optical lens of the present description. For example, an eyewear may include one or two optical lenses 1000 or 2000. Eyewear may be worn by a viewer and may include at least one optical lens for receiving light from an exterior of the eyewear and transmitting at least a portion of the light through an optical lens to an eye of the viewer. FIG. 3 is a schematic perspective view of a pair of glasses 1100 including first and second optical lenses 3000-1 and 3000-2, either of which may correspond to any of the optical lenses of the present description. For example, one or both of first and second optical lenses 3000-1 and 3000-2 may correspond to optical lens 1000, or 2000, or 7000. The pair of glasses 1100 includes the first and second optical lenses 3000-1 and 3000-2 disposed in frame 3617. The eyeglasses are configured such that at least a portion 3767 of a light 3765 incident on an optical lens 3000-1 (or 3000-2) of the eyeglasses from an exterior of the eyeglasses is transmitted through the optical lens 3000-1 (or 3000-2).

In some embodiments, an optical lens includes first and second polarizers and first and second phase retarders and a partial reflector as described elsewhere herein. In some embodiments, the pass axis of the first and second polarizers and the fast axis and the retardances of the first and second phase retarder are selected such that the optical lens has a single focal length. For example, in the embodiments illustrated in FIGS. 1A-1B, all or substantially all light transmitted through the optical lens 1000 or 1000*b* passes through the optical lens 1000 or 1000*b* along the illustrated folded optical path. In other embodiments, at least a portion of light having both the third and fourth polarization states 510 and 520 is transmitted through the first polarizer 200. For example, the first polarizer 200 can be omitted or rotated (e.g., by 45 degrees about the optical axis 1010), or the first and second phase retarders 300 and 600 can be modified, so that at least a portion of light having both the third and fourth polarization states 510 and 520 is transmitted through the first polarizer 200. In such embodiments, light to the viewer 1050 has two different types of focal lengths; one for light that passed directly through the optical lens to the viewer 1050 and another for light that follows a folded optical path.

FIGS. 4A-4B are schematic cross-sectional views of optical lens 4000 including first and second optical stacks 4250 and 4350 on opposing major surfaces of substrate 4100. In some embodiments, first optical stack 4250 includes a first polarizer substantially transmitting light having a first polarization state and substantially blocking light having an orthogonal second polarization state, and second optical stack 4350 includes a second polarizer substantially transmitting light having a third polarization state and substantially reflecting light having an orthogonal fourth polarization state. In other embodiments, the first optical stack 4250 includes the second polarizer and second optical stack 4350 includes the first polarizer (see, e.g., FIGS. 14A-B). In some embodiments, first optical stack 4250 further includes a partial reflector disposed between the first and second polarizers and having an average optical reflectance of at least 30% for a desired plurality of wavelengths, and a first phase retarder disposed between the first polarizer and the partial reflector for changing a polarization state of light passing therethrough. In some embodiments, the second optical stack 4350 includes a second phase retarder disposed between the partial reflector and the second polarizer for changing a polarization state of light passing therethrough.

The optical lens 4000 has a focal length f2 (length along optical axis 4010 between a center of the optical lens 4000 and focal point 4766*a*) for light 4762 having a polarization state (e.g., fourth polarization state 520) such that it reflects from the second optical stack 4350 when it is first incident on the second optical stack 4350. Optical lens 4000 has a focal length f1 (length along optical axis 4010 between a center of the optical lens 4000 and focal point 4766*b*) for light 4761 having a polarization state (e.g., third polarization state 510) such that it is transmitted through second optical stack 4350 when it is first incident on the second optical stack 4350. For light 4761, optical lens 4000 also has a first effective focal length being a distance along the optical axis 4010 between a rear principal plane of the optical lens 4000 and the focal point 4766*b*, and has a first back focal length being a distance along the optical axis 4010 between the last optical surface of the optical lens 4000 (the outer surface of second optical stack 4350) and the focal point 4766*b*. For light 4762, optical lens 4000 also has a second effective focal length being a distance along the optical axis 4010 between a rear principal plane of the optical lens 4000 and the focal point 4766*a*, and has a second back focal length being a distance along the optical axis 4010 between the last optical surface of the optical lens 4000 (the outer surface of second optical stack 4350) and the focal point 4766*a*.

In other embodiments, the first and second optical stacks 4250 and 4350 are selected such that light 4761 is prevented or substantially prevented from passing through the optical lens. For example, first and second optical stacks may correspond to first and second optical stacks 250 and 350 which prevents or substantially prevents light having the second polarization state 220 from reaching the viewer 1050, while light having the first polarization state 210 is transmitted to the viewer 1050 along a folded optical path.

In some embodiments, the second optical stack 4350 includes a reflective polarizer substantially transmitting light having a third polarization state and substantially reflecting light having an orthogonal fourth polarization state. In some embodiments, the optical lens 4000 has a longer first focal length for light having the third polarization state and a shorter second focal length for light having the fourth polarization state. In some embodiments, the second focal length is about half the first focal length. In some embodiments, the second focal length is between 0.3 and 0.7, or 0.4 and 0.6, or 0.45 and 0.55, of the first focal length. In some embodiments, the first focal length is greater than about 50 mm, or greater than about 100 mm, or greater than about 150 mm, and the second focal length is less than less than about 300 mm, or less than about 400 mm. In some embodiments, the first focal length is the focal length f1 and the second focal length is the focal length f2. In some embodiments, the first focal length is the first effective focal length or the first back focal length, and the second focal length is the second effective focal length or the second back focal length.

Numbers expressing feature sizes, amounts, and physical properties which are modified by the term "about" refer to a numerical range about the expressed number of plus or minus 20 percent of the expressed number, unless the context clearly indicates differently. For example, a number of about x can be understood to be a number between 0.8 x and 1.2 x, unless the context clearly indicates differently.

The optical lens 4000 may also be characterized in terms of optical power which is the inverse of the effective focal length. In some embodiments, the optical lens 4000 has a smaller first optical power for light having the third polarization state and a larger second optical power for light having the fourth polarization state. In some embodiments, the second optical power is about twice the first optical power. In some embodiments, the second optical power is between 1.4 and 2.0, or 1.6 and 2.4, or 1.8 and 2.2, times the first optical power. In some embodiments, the absolute value of first optical power is less than 20 diopters, or less than 10 diopters, or less than 7 diopters, and the absolute value second optical power is greater than 3 diopters, or greater than 2.5 diopters.

Figure 5:
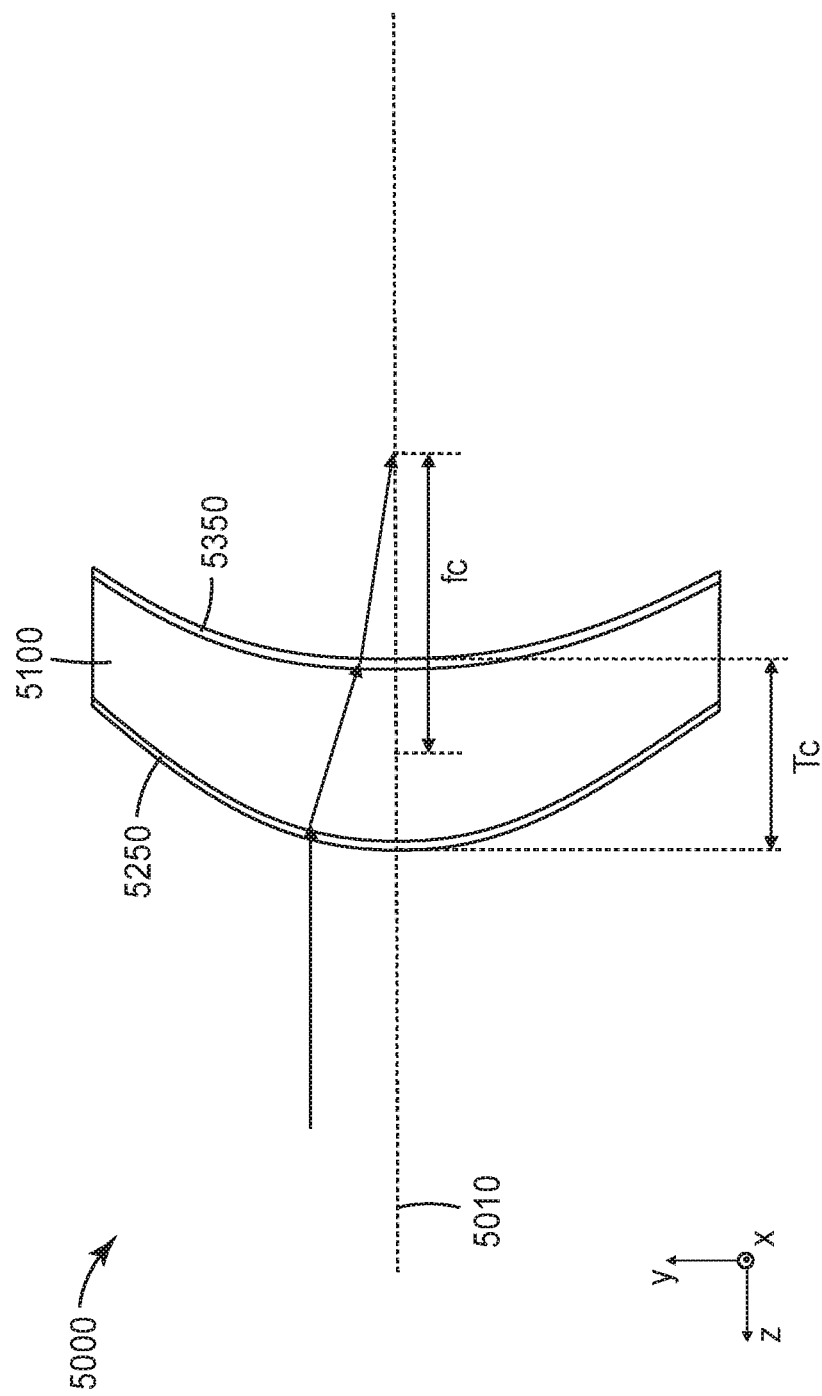
FIG. 5 is a schematic cross-sectional view of a comparative optical lens.

Optical lens 4000 has a thickness T1 of the along the optical axis 4010. FIG. 5 is a schematic cross-sectional view of a comparative optical lens 5000 which includes substrate 5100 and first and second optical stacks 5250 and 5350 disposed on opposing major surfaces of the substrate 5100. First and second optical stacks 5250 and 5350 correspond to first and second optical stacks 4250 and 4350, respectively, except that a component is omitted from one of the first and second optical stacks 4250 and 4350. In embodiments where the first optical stack 4250 includes a partial reflector and the second optical stack 4350 includes a reflective polarizer, either the first optical stack 5250 omits the partial reflector that is included in first optical stack 4250, or the second optical stack 5350 omits the reflective polarizer that is included in second optical stack 4350. In embodiments where the first optical stack 4250 includes a reflective polarizer and the second optical stack 4350 includes a partial reflector, the second optical stack 5350 omits the partial reflector that is included in second optical stack 4350, or the first optical stack 5250 omits the reflective polarizer that is included in first optical stack 4250. The substrate 5100 of the comparative optical lens 5000 is modified so that the comparative optical lens has a focal length equal to a focal length of the optical lens 4000. In the illustrated embodiment, the focal length fc of the comparative optical lens 5000 is equal to the focal length f2 of the optical lens 4000. In some embodiments, the optical lens 4000 has a thickness T1 which is less by at least 20%, or at least 50%, as compared to the thickness Tc of the comparative optical lens 5000. In some embodiments, the optical lens 4000 has different first and second focal lengths corresponding to folded or direct optical paths (e.g., as illustrated in FIGS. 4A and 4B, respectively) and the comparative optical lens 5000 has a single focal length corresponding to a direct optical path (e.g., as illustrated in FIG. 5).

The following is a list of exemplary embodiments of the present description.

Embodiment 1 is an optical lens, comprising:
 a first polarizer substantially transmitting light having a first polarization state and substantially blocking light having an orthogonal second polarization state;
 a second polarizer substantially transmitting light having a third polarization state and substantially reflecting light having an orthogonal fourth polarization state;
 a partial reflector disposed between the first and second polarizers and having an average optical reflectance of at least 30% for a desired plurality of wavelengths;
 a first phase retarder disposed between the first polarizer and the partial reflector for changing a polarization state of light passing therethrough; and
 a second phase retarder disposed between the partial reflector and the second polarizer for changing a polarization state of light passing therethrough, wherein the optical lens is a single piece configured for use in an eyewear.

Embodiment 2 is the optical lens of Embodiment 1 further comprising a substrate disposed between the partial reflector and the second polarizer and having an average optical transmittance of at least 80% for the desired plurality of wavelengths.

Embodiment 3 is the optical lens of Embodiment 2, wherein the substrate comprises a first major surface configured to face away from a viewer and an opposite second major surface configured to face toward the viewer.

Embodiment 4 is the optical lens of Embodiment 3, wherein the first polarizer is disposed on the first major surface of the substrate, and the second polarizer is disposed on the second major surface of the substrate.

Embodiment 5 is the optical lens of Embodiment 3, wherein the first polarizer is disposed on the second major surface of the substrate, and the second polarizer is disposed on the first major surface of the substrate.

Embodiment 6 is the optical lens of Embodiment 3, wherein at least one of the first and second major surfaces of the substrate is curved.

Embodiment 7 is the optical lens of Embodiment 3, wherein the first and second major surfaces of the substrate are curved and parallel to each other.

Embodiment 8 is the optical lens of Embodiment 3, wherein the first and second major surfaces of the substrate are curved and non-parallel to each other.

Embodiment 9 is the optical lens of Embodiment 3, wherein the first and second major surfaces of the substrate curve toward each other.

Embodiment 10 is the optical lens of Embodiment 3, wherein the first and second major surfaces of the substrate curve away from each other.

Embodiment 11 is the optical lens of Embodiment 3, wherein the first and second major surfaces of the substrate curve away from the first polarizer.

Embodiment 12 is the optical lens of Embodiment 3, wherein the first and second major surfaces of the substrate curve toward the first polarizer.

Embodiment 13 is the optical lens of Embodiment 3, wherein each of the first polarizer, the first phase retarder, and the partial reflector substantially conforms to the first major surface of the substrate.

Embodiment 14 is the optical lens of Embodiment 3, wherein each of the second polarizer and the second phase retarder substantially conforms to the second major surface of the substrate.

Embodiment 15 is the optical lens of Embodiment 3, wherein each of the first polarizer, the first phase retarder, the partial reflector, and the second phase retarder substantially conforms to the second major surface of the substrate.

Embodiment 16 is the optical lens of Embodiment 3, wherein the second polarizer substantially conforms to the first major surface of the substrate.

Embodiment 17 is the optical lens of Embodiment 1, wherein the first polarization state is substantially parallel to the third polarization state.

Embodiment 18 is the optical lens of Embodiment 17, wherein each of the first and second phase retarders comprises orthogonal fast and slow axes, the fast axes of the first and second phase retarders being substantially parallel to each other.

Embodiment 19 is the optical lens of Embodiment 1, wherein the first polarization state is substantially perpendicular to the third polarization state.

Embodiment 20 is the optical lens of Embodiment 19, wherein each of the first and second phase retarders comprises orthogonal fast and slow axes, the fast axes of the first and second phase retarders being substantially perpendicular to each other.

Embodiment 21 is the optical lens of Embodiment 1 having an optical axis such that a light ray propagating along the optical axis passes through the optical lens without being substantially refracted, a thickness of the optical lens along the optical axis being less by at least 20% as compared to a comparative optical lens having the same construction except that it does not have the partial reflector and where the substrate of the comparative optical lens is modified so that the comparative optical lens has substantially a same focal length as the optical lens.

Embodiment 22 is the optical lens of Embodiment 21, wherein the thickness of the optical lens along the optical axis is less by at least 50% as compared to a comparative optical lens having the same construction except that it does not have the partial reflector and where the substrate of the comparative optical lens is modified so that the comparative optical lens has substantially a same focal length as the optical lens.

Embodiment 23 is the optical lens of Embodiment 1 comprising a first region for viewing an object at a greater first distance from the optical lens and a second region for viewing an object at a smaller second distance from the optical lens.

Embodiment 24 is the optical lens of Embodiment 1, wherein one or both of the first and second phase retarders is a quarter-wave retarder.

Embodiment 25 is the optical lens of Embodiment 1, wherein the second phase retarder is an eighth-wave retarder.

Embodiment 26 is the optical lens of Embodiment 25, further comprising a third phase retarder disposed between the partial reflector and the second phase retarder, wherein the third phase retarder is an eighth-wave retarder.

Embodiment 27 is an eyewear comprising the optical lens of Embodiment 1.

Embodiment 28 is a pair of glasses comprising a first single piece optical lens according to Embodiment 1 and a second single piece optical lens according to Embodiment 1.

Embodiment 29 is the optical lens of Embodiment 1 being single piece by virtue of at least one of the first polarizer, the second polarizer, the partial reflector, the first phase retarder and the second phase retarder formed directly on an adjacent first internal major surface of the optical lens, and at least one of the first polarizer, the second polarizer, the partial reflector, the first phase retarder and the second phase retarder is formed directly on an adjacent second internal major surface of the optical lens.

Embodiment 30 is the optical lens of Embodiment 1 being single piece by virtue of at least one of the first polarizer, the second polarizer, the partial reflector, the first phase retarder and the second phase retarder laminated to an adjacent first internal major surface of the optical lens via an adhesive, and at least one of the first polarizer, the second polarizer, the partial reflector, the first phase retarder and the second phase retarder is formed directly on an adjacent second internal major surface of the optical lens.

Embodiment 31 is the optical lens of Embodiment 1 having a longer first focal length for light having the third polarization state and a shorter second focal length for light having the fourth polarization state.

Embodiment 32 is the optical lens of Embodiment 31, wherein the second focal length is about half the first focal length.

Embodiment 33 is a bi-focal optical lens for use in an eyewear, comprising:
a substrate; and
a reflective polarizer bonded to the substrate, the reflective polarizer substantially transmitting light having a first polarization state and substantially reflecting light having an orthogonal second polarization state, the bi-focal optical lens having a longer first focal length for light having the first polarization state and a shorter second focal length for light having the second polarization state, such that without the reflective polarizer, the bi-focal optical lens would have a single focal length.

Embodiment 34 is a bi-focal optical lens for use in an eyewear, comprising:
a substrate; and
a partial reflector bonded to the substrate, the partial reflector having an average optical reflectance of at least 30% for a desired plurality of wavelengths, the bi-focal optical lens having a longer first focal length for light having a first polarization state and a shorter second focal length for light having an orthogonal second polarization state, such that without the partial reflector, the bi-focal optical lens would have a single focal length.

Embodiment 35 is the bi-focal optical lens of Embodiment 33 or 34, wherein the single focal length is substantially equal to the first focal length.

Embodiment 36 is the bi-focal optical lens of Embodiment 33 or 34, wherein the second focal length is about half the first focal length.

Embodiment 37 is the bi-focal optical lens of Embodiment 33 or 34, wherein the first focal length is greater than about 100 mm and the second focal length is less than about 300 mm.

Embodiment 38 is eyeglasses comprising a bi-focal optical lens according to any one of Embodiments 33 to 37, wherein the eyeglasses are configured to be worn by a viewer and to receive light from an exterior of the eyeglasses and transmit at least a portion of the received light through the bi-focal optical lens to an eye of the viewer.

Embodiment 39 is an optical lens, comprising:
a first polarizer substantially transmitting light having a first polarization state and substantially blocking light having an orthogonal second polarization state;
a second polarizer substantially transmitting light having a third polarization state and substantially reflecting light having an orthogonal fourth polarization state; and
a partial reflector disposed between the first and second polarizers and having an average optical reflectance of at least 30% for a desired plurality of wavelengths,
wherein the optical lens is a single piece configured for use in an eyewear.

Embodiment 40 is the optical lens of Embodiment 39, wherein the first and second polarization states are linear polarization states.

Embodiment 41 is the optical lens of Embodiment 39, further comprising a first phase retarder disposed between the first polarizer and the partial reflector for changing a polarization state of light passing therethrough.

Embodiment 42 is the optical lens of Embodiment 41, wherein the first phase retarder is a quarter-wave retarder at a wavelength in the desired plurality of wavelengths.

Embodiment 43 is the optical lens of Embodiment 39, wherein the third and fourth polarization states are circular polarization states.

Embodiment 44 is the optical lens of Embodiment 39, wherein the second polarizer comprises a linear polarizer and a second phase retarder disposed between the partial reflector and the linear polarizer for changing a polarization state of light passing therethrough.

Embodiment 45 is the optical lens of Embodiment 39, wherein the first polarizer comprises a linear polarizer and a first phase retarder disposed between the partial reflector and the linear polarizer for changing a polarization state of light passing therethrough.

Embodiment 46 is the optical lens of Embodiment 39, wherein the first and second polarization states are linear polarization states and the third and fourth polarization states are circular polarization states.

Embodiment 47 is the optical lens of Embodiment 39, further comprising a second phase retarder disposed between the partial reflector and the second polarizer for changing a polarization state of light passing therethrough.

Embodiment 48 is the optical lens of Embodiment 47, wherein the third and fourth polarization states are linear polarization states.

Embodiment 49 is the optical lens of Embodiment 47, wherein the second phase retarder is a quarter-wave retarder at a wavelength in the desired plurality of wavelengths.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. An optical lens, comprising:
a first polarizer substantially transmitting light having a first polarization state and substantially blocking light having an orthogonal second polarization state;
a second polarizer substantially transmitting light having a third polarization state and substantially reflecting light having an orthogonal fourth polarization state;
a partial reflector disposed between the first and second polarizers and having an average optical reflectance of at least 30% for a desired plurality of wavelengths;
a first phase retarder disposed between the first polarizer and the partial reflector for changing a polarization state of light passing therethrough; and
a second phase retarder disposed between the partial reflector and the second polarizer for changing a polarization state of light passing therethrough,
wherein the optical lens is a single piece prescription eyewear lens, and wherein the optical lens has a first focal length for light having the third polarization state and a second focal length for light having the fourth polarization state, the first focal length being longer than the second focal length.

2. The optical lens of claim 1 further comprising a substrate disposed between the partial reflector and the second polarizer and having an average optical transmittance of at least 80% for the desired plurality of wavelengths.

3. The optical lens of claim 2, wherein the substrate comprises a first major surface configured to face away from a viewer and an opposite second major surface configured to face toward the viewer, at least one of the first and second major surfaces of the substrate being curved.

4. The optical lens of claim 1, wherein the first polarization state is substantially parallel to the third polarization state, and each of the first and second phase retarders comprises orthogonal fast and slow axes, the fast axes of the first and second phase retarders being substantially parallel to each other.

5. The optical lens of claim 1, wherein the first polarization state is substantially perpendicular to the third polarization state, and each of the first and second phase retarders comprises orthogonal fast and slow axes, the fast axes of the first and second phase retarders being substantially perpendicular to each other.

6. The optical lens of claim 1 having an optical axis such that a light ray propagating along the optical axis passes through the optical lens without being substantially refracted, a thickness of the optical lens along the optical axis being less by at least 20% as compared to a comparative optical lens having the same construction except that it does not have the partial reflector and where the substrate of the comparative optical lens is modified so that the comparative optical lens has substantially a same focal length as the optical lens.

7. The optical lens of claim 6, wherein the thickness of the optical lens along the optical axis is less by at least 50% as compared to a comparative optical lens having the same construction except that it does not have the partial reflector and where the substrate of the comparative optical lens is modified so that the comparative optical lens has substantially a same focal length as the optical lens.

8. The optical lens of claim 1 comprising a first region configured for prescription viewing an object at a first distance from the optical lens and a second region configured for prescription viewing an object at a second distance from the optical lens, the first distance being greater than the second distance.

9. An eyewear comprising the optical lens of claim 1.

10. The optical lens of claim 1, wherein the second focal length is between 0.3 and 0.7 times the first focal length.

* * * * *